(12) United States Patent
Yoshinaga et al.

(10) Patent No.: US 8,670,194 B2
(45) Date of Patent: Mar. 11, 2014

(54) SINGLE FOCAL LENGTH LENS SYSTEM, INTERCHANGEABLE LENS APPARATUS AND CAMERA SYSTEM

(71) Applicant: Panasonic Corporation, Osaka (JP)

(72) Inventors: Shunichiro Yoshinaga, Osaka (JP); Kyoichi Miyazaki, Osaka (JP); Takao Yamanaka, Osaka (JP); Keiichi Zaitsu, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/757,390

(22) Filed: Feb. 1, 2013

(65) Prior Publication Data
US 2013/0141629 A1   Jun. 6, 2013

Related U.S. Application Data

(63) Continuation of application No. PCT/JP2011/004402, filed on Aug. 3, 2011.

(30) Foreign Application Priority Data

Aug. 25, 2010   (JP) .................. 2010-187817

(51) Int. Cl.
| | |
|---|---|
| *G02B 9/04* | (2006.01) |
| *G02B 15/14* | (2006.01) |
| *G02B 9/08* | (2006.01) |
| *G02B 15/22* | (2006.01) |
| *G02B 13/00* | (2006.01) |

(52) U.S. Cl.
CPC .. *G02B 9/08* (2013.01); *G02B 9/04* (2013.01); *G02B 15/22* (2013.01); *G02B 13/002* (2013.01)
USPC ............................. 359/793; 359/684; 359/754

(58) Field of Classification Search
USPC ................ 359/676, 684, 689–690, 753–754, 359/784–792
See application file for complete search history.

(56) References Cited

U.S. PATENT DOCUMENTS

| | | | |
|---|---|---|---|
| 6,417,975 B1 * | 7/2002 | Isono ............................ | 359/783 |
| 7,869,143 B2 * | 1/2011 | Sudoh ........................... | 359/793 |
| 2005/0057824 A1 | 3/2005 | Amanai | |
| 2006/0056831 A1 * | 3/2006 | Horio et al. ..................... | 396/55 |
| 2010/0195221 A1 | 8/2010 | Sato | |
| 2011/0085254 A1 * | 4/2011 | Wang et al. ................... | 359/716 |

FOREIGN PATENT DOCUMENTS

| | | |
|---|---|---|
| JP | 06-130291 A | 5/1994 |
| JP | 2004-029641 A | 1/2004 |
| JP | 2005-031638 A | 2/2005 |
| JP | 2010-176018 A | 8/2010 |

OTHER PUBLICATIONS

International Search Report issued in International Patent Application No. PCT/JP2011/004402 mailed Sep. 13, 2011.

* cited by examiner

*Primary Examiner* — Thong Nguyen
(74) *Attorney, Agent, or Firm* — McDermott Will & Emery LLP

(57) ABSTRACT

A single focal length lens system comprising a front lens unit, an aperture diaphragm, and a rear lens unit, wherein the front lens unit is composed of three or less lenses including a negative lens located closest to the object side and a positive lens located on the image side relative to the negative lens, and does not move along an axis in focusing, the rear lens unit includes a focusing lens unit moving along the axis and a fixed lens unit not moving along the axis in focusing, and the conditions: $0.4<f_W/f_{GF}<1.5$, $0.9<f_W/T_1<4.5$, and $-0.3<f_W/f_{G1}<0.3$ ($f_W$, $f_{GF}$, $f_{G1}$: focal lengths of the entire single focal length lens system, the focusing lens unit, the front lens unit, $T_1$: an axial distance from an object side lens surface of the negative lens to the aperture diaphragm) are satisfied.

6 Claims, 21 Drawing Sheets

SINGLE FOCAL LENGTH LENS SYSTEM, INTERCHANGEABLE LENS APPARATUS AND CAMERA SYSTEM

RELATED APPLICATIONS

This application is the Continuation of International Application No. PCT/JP2011/004402, filed on Aug. 3, 2011, which in turn claims the benefit of Japanese Application No. 2010-187817, filed on Aug. 25, 2010, the disclosures of which Applications are incorporated by reference herein.

BACKGROUND

1. Field

The present disclosure relates to single focal length lens systems, interchangeable lens apparatuses, and camera systems.

2. Description of the Related Art

In recent years, interchangeable-lens type digital camera systems (also referred to simply as "camera systems", hereinafter) have been spreading rapidly. Such a camera system includes: a camera body having an image sensor such as a CCD (Charge Coupled Device), a CMOS (Complementary Metal-Oxide Semiconductor) or the like; and an interchangeable lens apparatus including an imaging lens system for forming an optical image on a light acceptance surface of the image sensor.

The camera system uses an image sensor larger than an image sensor mounted in a compact digital camera, and therefore, can take high-sensitive and high-quality images. Further, the camera system realizes high-speed focusing and high-speed image processing after image taking, and easy replacement of an interchangeable lens apparatus in accordance with a desired scene.

An interchangeable lens apparatus including a single focal length lens system is popular because it is lightweight and compact and is capable of taking pictures having excellent background blur effect as compared with an interchangeable lens apparatus including a focal-length-variable zoom lens system. Accordingly, various kinds of single focal length lens systems usable as imaging lens systems in camera systems have conventionally been proposed, such as single focal length lens systems disclosed in Japanese Laid-Open Patent Publications Nos. 06-130291 and 2004-029641.

SUMMARY

The present disclosure provides a compact and lightweight single focal length lens system having excellent imaging performance, which can be appropriately used in a camera system, and realizes inner focusing capable of high-speed and silent focusing. Further, the present disclosure provides an interchangeable lens apparatus and a camera system which are compact and lightweight.

The novel concepts disclosed herein were achieved in order to solve the foregoing problems in the related art, and herein is disclosed:

a single focal length lens system, in order from an object side to an image side, comprising a front lens unit, an aperture diaphragm, and a rear lens unit composed of a plurality of lens units, wherein the front lens unit includes a negative lens element which has negative optical power and is located closest to the object side, and a positive lens element which has positive optical power and is located on the image side relative to the negative lens element, is composed of three or less lens elements, and does not move along an optical axis but is fixed in focusing from an infinity in-focus condition to a close-object in-focus condition, the rear lens unit includes a focusing lens unit which moves along the optical axis in focusing, and a fixed lens unit which does not move along the optical axis but is fixed in focusing, and the following conditions (1), (2), and (3) are satisfied:

$$0.4 < f_W/f_{GF} < 1.5 \quad (1)$$

$$0.9 < f_W/T_1 < 4.5 \quad (2)$$

$$-0.3 < f_W/f_{G1} < 0.3 \quad (3)$$

where $f_W$ is a focal length of the entire single focal length lens system in an infinity in-focus condition, $f_{GF}$ is a focal length of the focusing lens unit, $T_1$ is an optical axial distance from an object side lens surface of the negative lens element in the front lens unit to the aperture diaphragm, and $f_{G1}$ is a focal length of the front lens unit.

The novel concepts disclosed herein were achieved in order to solve the foregoing problems in the related art, and herein is disclosed:

an interchangeable lens apparatus comprising:

a single focal length lens system; and a lens mount section which is connectable to a camera body including an image sensor for receiving an optical image formed by the single focal length lens system and converting the optical image into an electric image signal, wherein the single focal length lens system, in order from an object side to an image side, comprises a front lens unit, an aperture diaphragm, and a rear lens unit composed of a plurality of lens units, in which the front lens unit includes a negative lens element which has negative optical power and is located closest to the object side, and a positive lens element which has positive optical power and is located on the image side relative to the negative lens element, is composed of three or less lens elements, and does not move along an optical axis but is fixed in focusing from an infinity in-focus condition to a close-object in-focus condition, the rear lens unit includes a focusing lens unit which moves along the optical axis in focusing, and a fixed lens unit which does not move along the optical axis but is fixed in focusing, and the following conditions (1), (2), and (3) are satisfied:

$$0.4 < f_W/f_{GF} < 1.5 \quad (1)$$

$$0.9 < f_W/T_1 < 4.5 \quad (2)$$

$$-0.3 < f_W/f_{G1} < 0.3 \quad (3)$$

where $f_W$ is a focal length of the entire single focal length lens system in an infinity in-focus condition, $f_{GF}$ is a focal length of the focusing lens unit, $T_1$ is an optical axial distance from an object side lens surface of the negative lens element in the front lens unit to the aperture diaphragm, and $f_{G1}$ is a focal length of the front lens unit.

The novel concepts disclosed herein were achieved in order to solve the foregoing problems in the related art, and herein is disclosed:

a camera system comprising:

an interchangeable lens apparatus including a single focal length lens system; and a camera body which is detachably connected to the interchangeable lens apparatus via a camera mount section, and includes an image sensor for receiving an optical image formed by the single focal length lens system and converting the optical image into an electric image signal, wherein the single focal length lens system, in order from an object side to an image side, comprises a front lens unit, an aperture diaphragm, and a rear lens unit composed of a plurality of lens units, in which the front lens unit
  includes a negative lens element which has negative optical power and is located closest to the object side, and a positive lens element which has positive optical power and is located on the image side relative to the negative lens element,
  is composed of three or less lens elements, and
  does not move along an optical axis but is fixed in focusing from an infinity in-focus condition to a close-object in-focus condition, the rear lens unit includes a focusing lens unit which moves along the optical axis in focusing, and a fixed lens unit which does not move along the optical axis but is fixed in focusing, and the following conditions (1), (2), and (3) are satisfied:

$$0.4 < f_W/f_{GF} < 1.5 \quad (1)$$

$$0.9 < f_W/T_1 < 4.5 \quad (2)$$

$$-0.3 < f_W/f_{G1} < 0.3 \quad (3)$$

where $f_W$ is a focal length of the entire single focal length lens system in an infinity in-focus condition, $f_{GF}$ is a focal length of the focusing lens unit, $T_1$ is an optical axial distance from an object side lens surface of the negative lens element in the front lens unit to the aperture diaphragm, and $f_{G1}$ is a focal length of the front lens unit.

The single focal length lens system according to the present disclosure is compact and lightweight, has excellent imaging performance, can be appropriately used in a camera system, and realizes inner focusing capable of high-speed and silent focusing.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

FIGS. 1, 3, 5, 7, 9, 11, 13, 15, 17, and 19 are lens arrangement diagrams of single focal length lens systems according to Embodiments 1 to 10, respectively, and each of the single focal length lens systems is in an infinity in-focus condition.

In each Fig., an arrow imparted to a lens unit indicates focusing from an infinity in-focus condition to a close-object in-focus condition. That is, in FIGS. 1, 3, 5, 7, 9, and 11, the arrow indicates the moving direction of a focusing lens unit G2 described later, in focusing from an infinity in-focus condition to a close-object in-focus condition. In FIGS. 13, 15, 17, and 19, the arrow indicates the moving direction of a focusing lens unit G3 described later, in focusing from an infinity in-focus condition to a close-object in-focus condition.

In each Fig., an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Each of the single focal length lens systems according to Embodiments 1 to 10, in order from the object side to the image side, comprises a front lens unit G1 having positive optical power or negative optical power, an aperture diaphragm A, and a rear lens unit.

Embodiment 1

Figure 1:
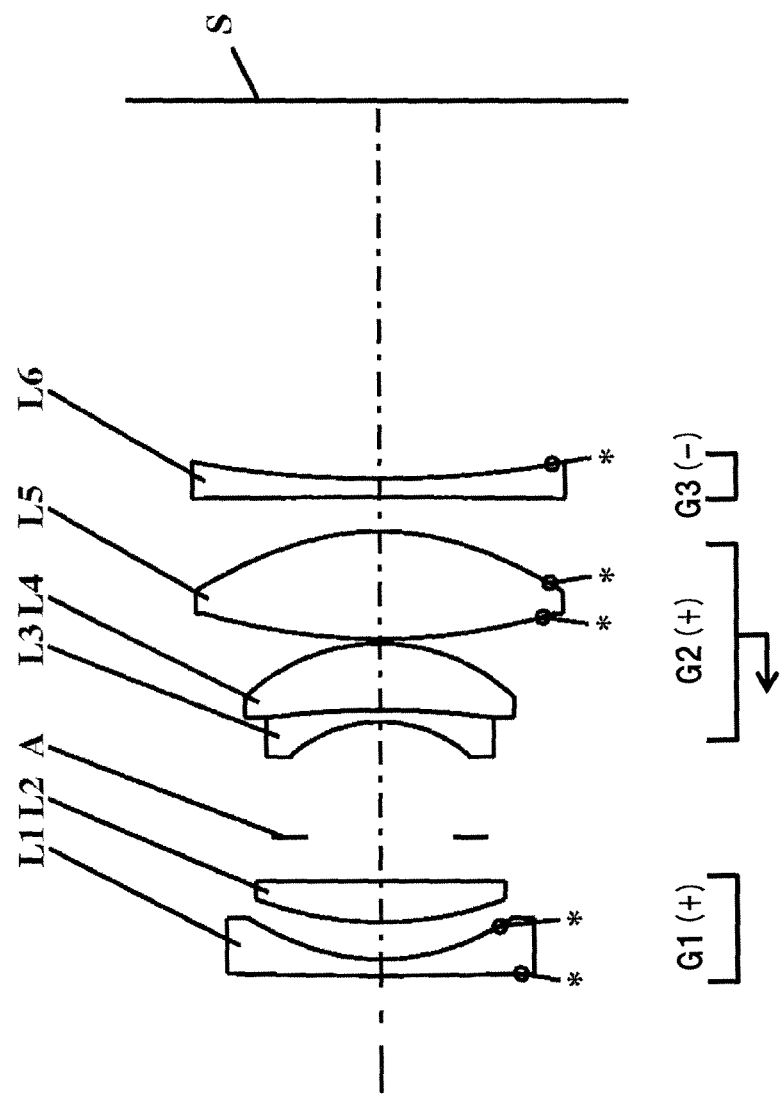
FIG. 1 is a lens arrangement diagram showing an infinity in-focus condition of a single focal length lens system according to Embodiment 1 (Numerical Example 1)
Figure 2:
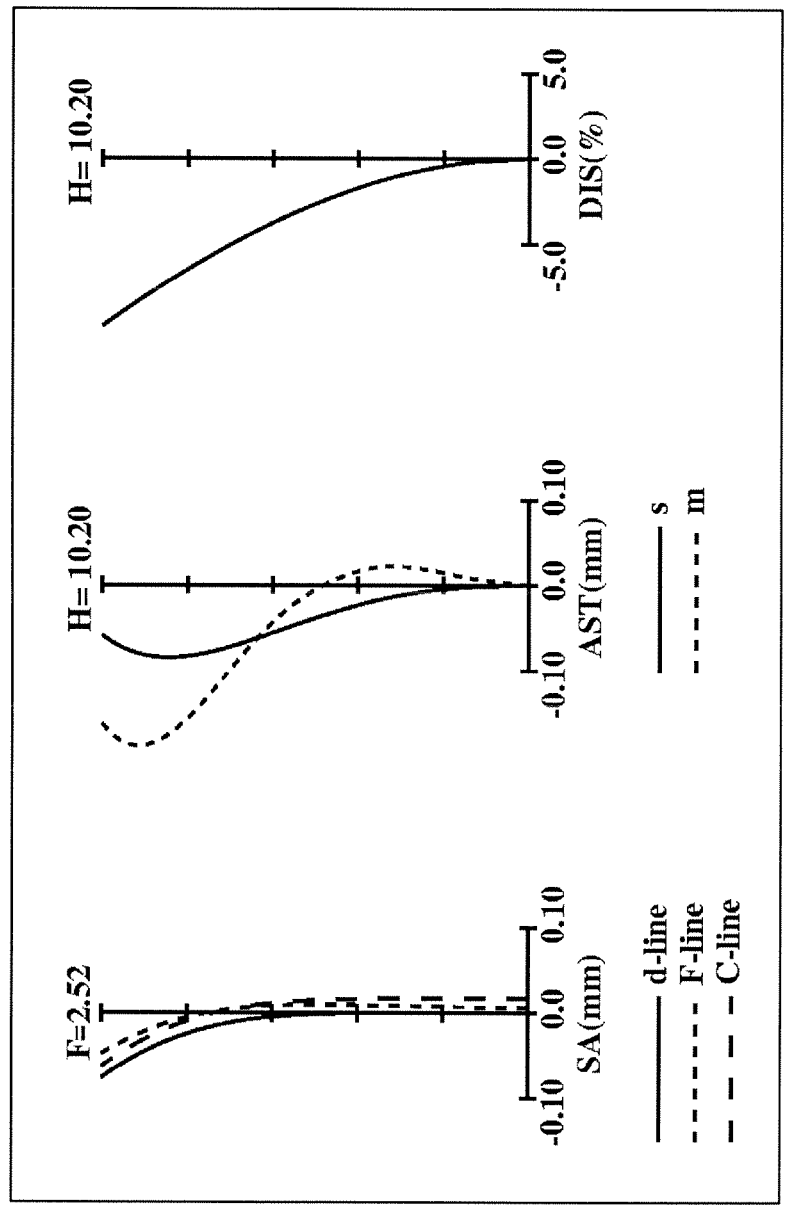
FIG. 2 is a longitudinal aberration diagram of an infinity in-focus condition of a single focal length lens system according to Numerical Example 1.

As shown in FIG. 1, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

The rear lens unit, in order from the object side to the image side, comprises: a focusing lens unit G2 which has positive optical power, and moves to the object side along the optical axis in focusing from an infinity in-focus condition to a close-object in-focus condition to perform focusing; and a fixed lens unit G3 which has negative optical power, and does not move along the optical axis but is fixed in focusing.

The focusing lens unit G2, in order from the object side to the image side, comprises: a negative meniscus third lens element L3 with the convex surface facing the image side; a positive meniscus fourth lens element L4 with the convex surface facing the image side; and a bi-convex fifth lens element L5 with the convex surface of greater curvature facing the image side. The third lens element L3 and the fourth lens element L4 are cemented with each other. In the surface data of the corresponding Numerical Example described later, surface number 8 is imparted to an adhesive layer between the third lens element L3 and the fourth lens element L4. The fifth lens element L5 has two aspheric surfaces.

The fixed lens unit G3 comprises solely a bi-concave sixth lens element L6 with the concave surface of greater curvature facing the image side. The sixth lens element L6 has an aspheric image side surface.

A flare-cut diaphragm is provided on the image side relative to the aperture diaphragm A. In the surface data of the corresponding Numerical Example described later, surface number 6 is imparted to the flare-cut diaphragm.

Embodiment 2

Figure 3:
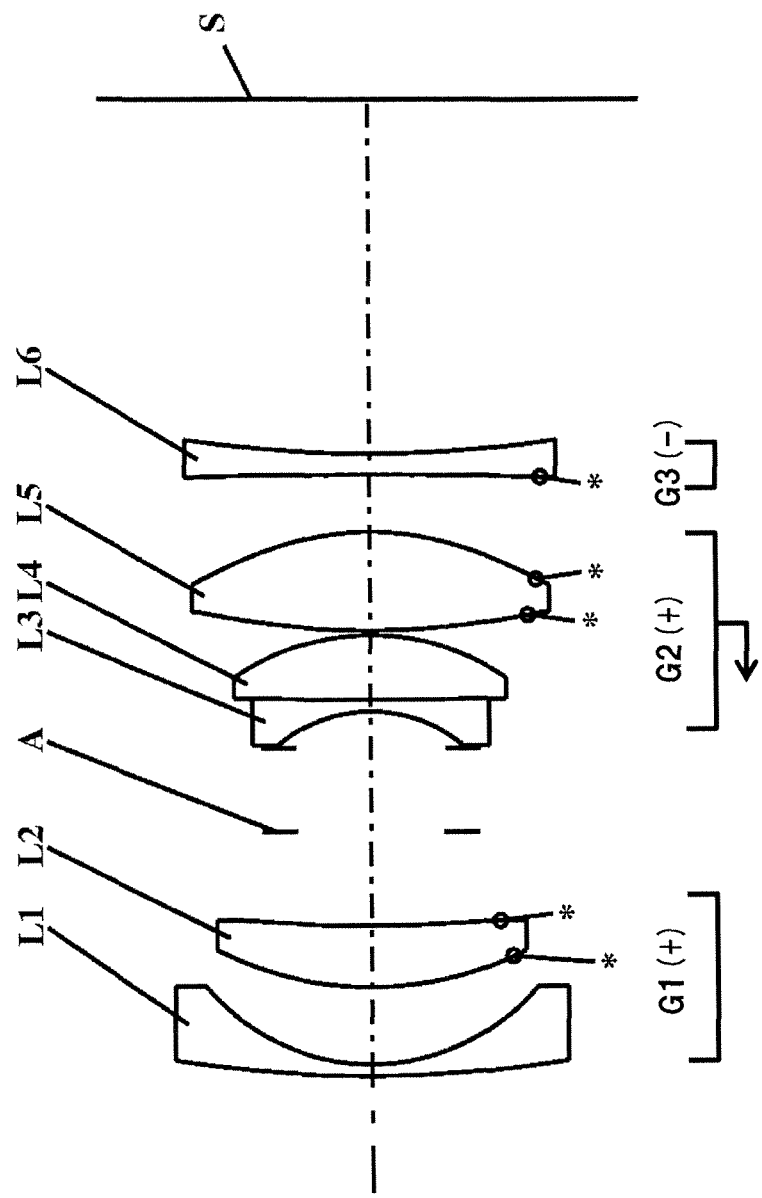
FIG. 3 is a lens arrangement diagram showing an infinity in-focus condition of a single focal length lens system according to Embodiment 2 (Numerical Example 2)
Figure 4:
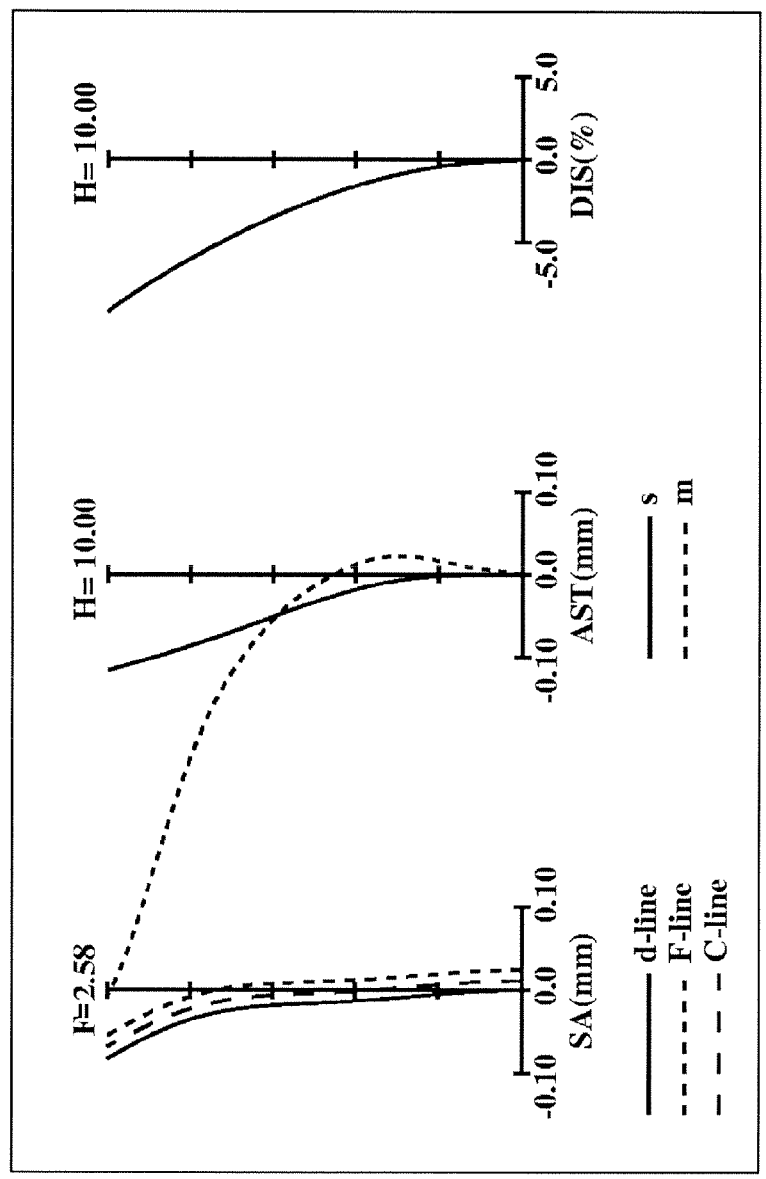
FIG. 4 is a longitudinal aberration diagram of an infinity in-focus condition of a single focal length lens system according to Numerical Example 2.

As shown in FIG. 3, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; and a positive meniscus second lens element L2 with the convex surface facing the object side. The second lens element L2 has two aspheric surfaces.

The rear lens unit, in order from the object side to the image side, comprises: a focusing lens unit G2 which has positive optical power, and moves to the object side along the optical axis in focusing from an infinity in-focus condition to a close-object in-focus condition to perform focusing; and a fixed lens unit G3 which has negative optical power, and does not move along the optical axis but is fixed in focusing.

The focusing lens unit G2, in order from the object side to the image side, comprises: a bi-concave third lens element L3 with the concave surface of greater curvature facing the object side; a bi-convex fourth lens element L4 with the convex surface of greater curvature facing the image side; and a bi-convex fifth lens element L5 with the convex surface of greater curvature facing the image side. The third lens element L3 and the fourth lens element L4 are cemented with each other. The fifth lens element L5 has two aspheric surfaces.

The fixed lens unit G3 comprises solely a bi-concave sixth lens element L6 with the concave surface of greater curvature facing the image side. The sixth lens element L6 has an aspheric object side surface.

A flare-cut diaphragm is provided on the image side relative to the aperture diaphragm A. In the surface data of the corresponding Numerical Example described later, surface number 6 is imparted to the flare-cut diaphragm.

Embodiment 3

Figure 5:
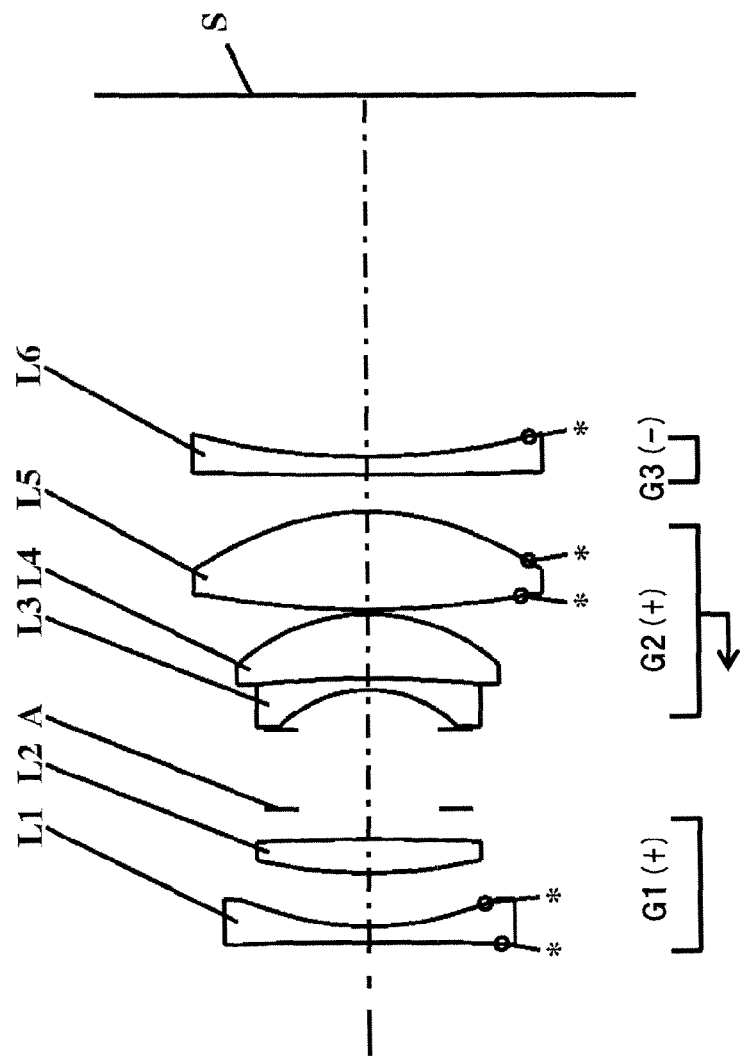
FIG. 5 is a lens arrangement diagram showing an infinity in-focus condition of a single focal length lens system according to Embodiment 3 (Numerical Example 3)
Figure 6:
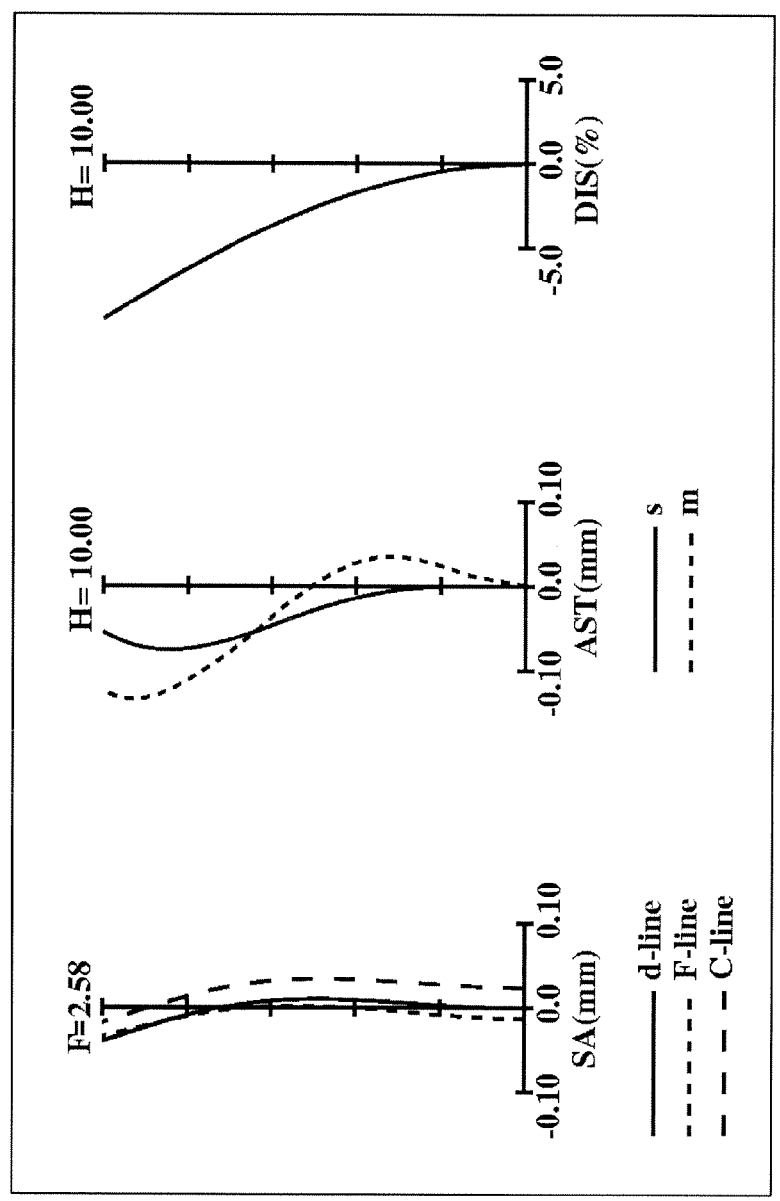
FIG. 6 is a longitudinal aberration diagram of an infinity in-focus condition of a single focal length lens system according to Numerical Example 3.

As shown in FIG. 5, the front lens unit G1 does not move along the optical axis but is fixed in focusing from an infinity in-focus condition to a close-object in-focus condition. The front lens unit G1, in order from the object side to the image side, comprises: a bi-concave first lens element L1 with the concave surface of greater curvature facing the image side; and a bi-convex second lens element L2 with the convex surface of greater curvature facing the object side. The first lens element L1 has two aspheric surfaces.

The rear lens unit, in order from the object side to the image side, comprises: a focusing lens unit G2 which has positive optical power, and moves to the object side along the optical axis in focusing from an infinity in-focus condition to a close-object in-focus condition to perform focusing; and a fixed lens unit G3 which has negative optical power, and does not move along the optical axis but is fixed in focusing.

The focusing lens unit G2, in order from the object side to the image side, comprises: a negative meniscus third lens element L3 with the convex surface facing the image side; a positive meniscus fourth lens element L4 with the convex surface facing the image side; and a bi-convex fifth lens element L5 with the convex surface of greater curvature facing the image side. The third lens element L3 and the fourth lens element L4 are cemented with each other. In the surface data of the corresponding Numerical Example described later, surface number 8 is imparted to an adhesive layer between the third lens element L3 and the fourth lens element L4. The fifth lens element L5 has two aspheric surfaces.

The fixed lens unit G3 comprises solely a negative meniscus sixth lens element L6 with the convex surface facing the object side. The sixth lens element L6 has an aspheric image side surface.

A flare-cut diaphragm is provided on the image side relative to the aperture diaphragm A. In the surface data of the corresponding Numerical Example described later, surface number 6 is imparted to the flare-cut diaphragm.

Embodiment 4

Figure 7:
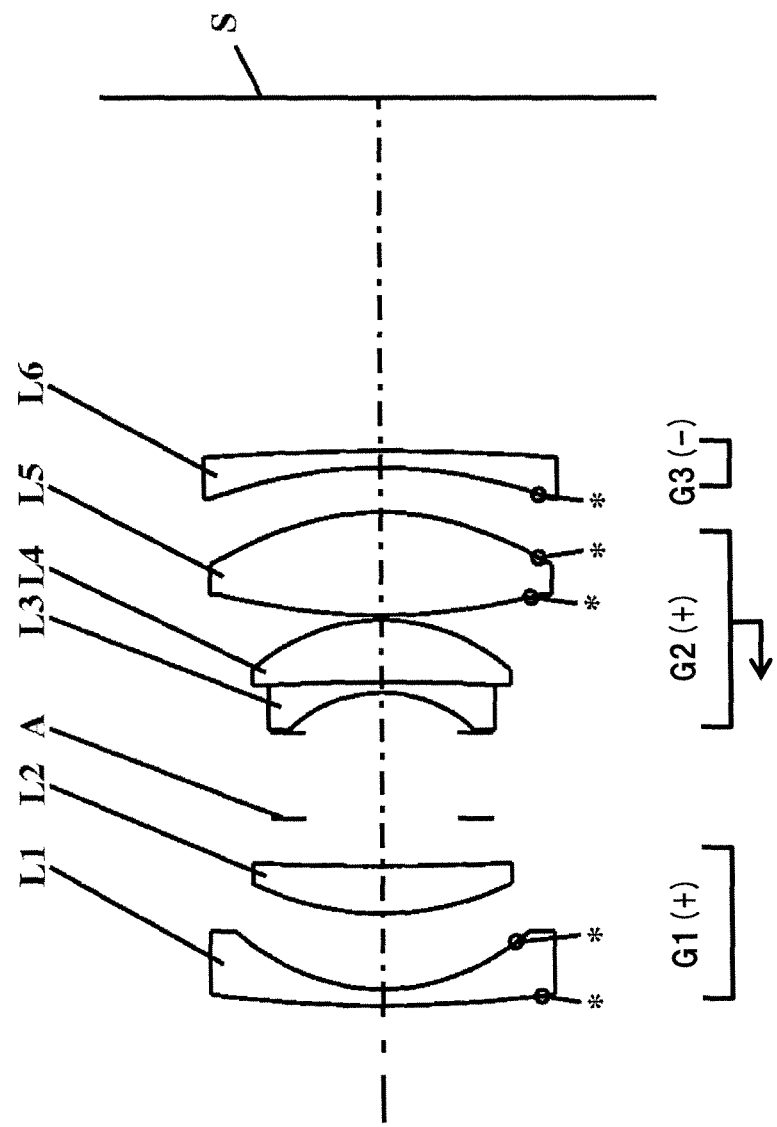
FIG. 7 is a lens arrangement diagram showing an infinity in-focus condition of a single focal length lens system according to Embodiment 4 (Numerical Example 4)
Figure 8:
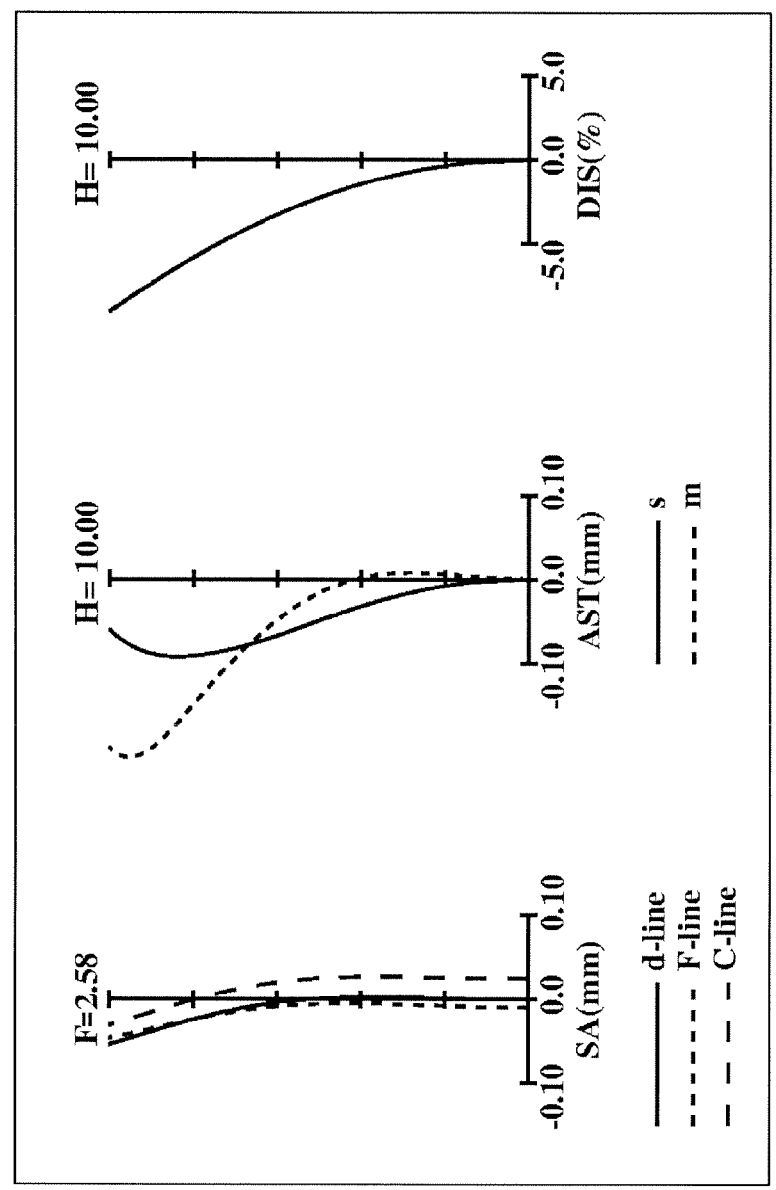
FIG. 8 is a longitudinal aberration diagram of an infinity in-focus condition of a single focal length lens system according to Numerical Example 4.

As shown in FIG. 7, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

The rear lens unit, in order from the object side to the image side, comprises: a focusing lens unit G2 which has positive optical power, and moves to the object side along the optical axis in focusing from an infinity in-focus condition to a close-object in-focus condition to perform focusing; and a fixed lens unit G3 which has negative optical power, and does not move along the optical axis but is fixed in focusing.

The focusing lens unit G2, in order from the object side to the image side, comprises: a negative meniscus third lens element L3 with the convex surface facing the image side; a positive meniscus fourth lens element L4 with the convex surface facing the image side; and a bi-convex fifth lens element L5 with the convex surface of greater curvature facing the image side. The third lens element L3 and the fourth lens element L4 are cemented with each other. In the surface data of the corresponding Numerical Example described later, surface number 8 is imparted to an adhesive layer between the third lens element L3 and the fourth lens element L4. The fifth lens element L5 has two aspheric surfaces.

The fixed lens unit G3 comprises solely a negative meniscus sixth lens element L6 with the convex surface facing the image side. The sixth lens element L6 has an aspheric object side surface.

A flare-cut diaphragm is provided on the image side relative to the aperture diaphragm A. In the surface data of the corresponding Numerical Example described later, surface number 6 is imparted to the flare-cut diaphragm.

Embodiment 5

Figure 9:
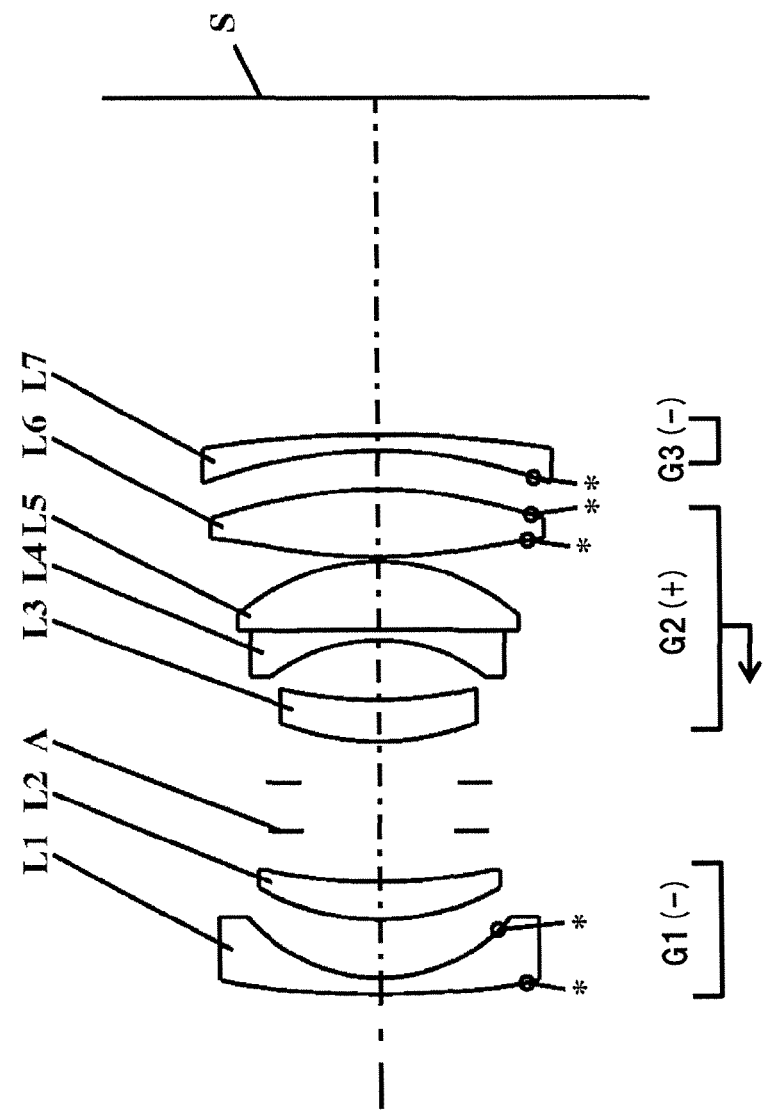
FIG. 9 is a lens arrangement diagram showing an infinity in-focus condition of a single focal length lens system according to Embodiment 5 (Numerical Example 5)
Figure 10:
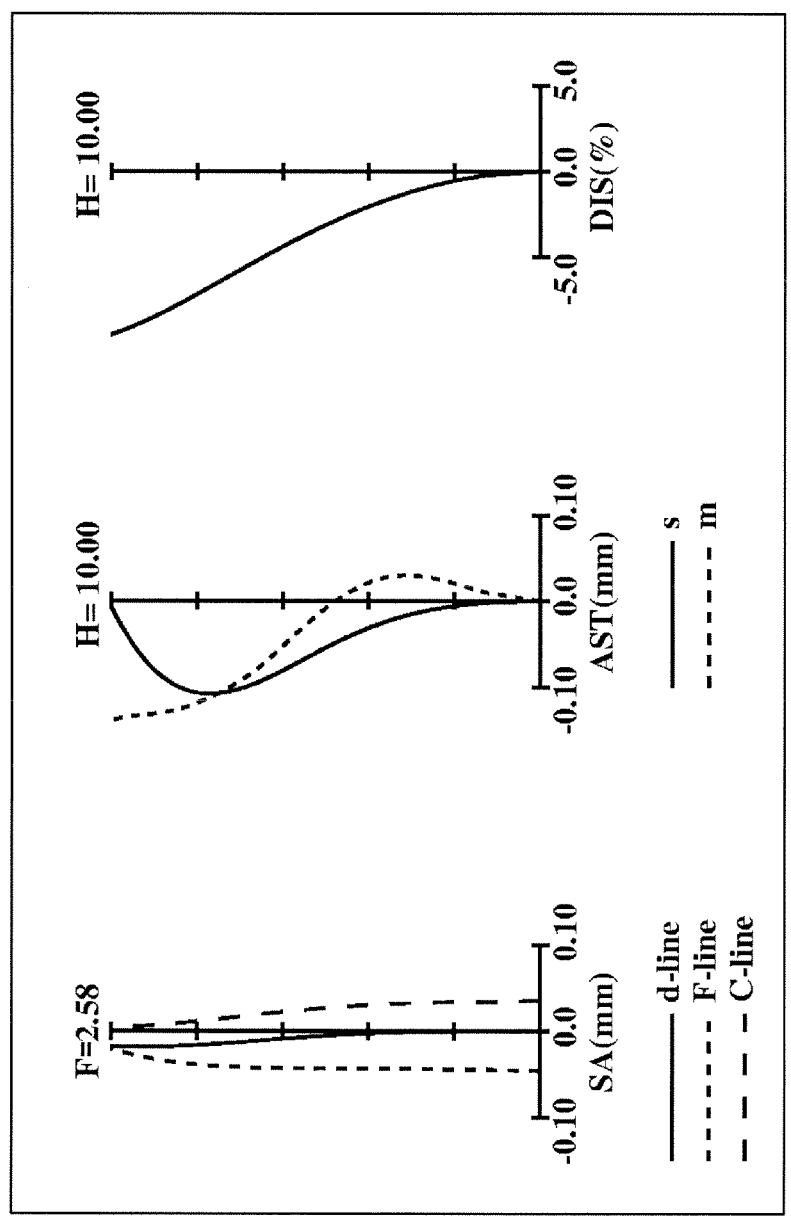
FIG. 10 is a longitudinal aberration diagram of an infinity in-focus condition of a single focal length lens system according to Numerical Example 5.

As shown in FIG. 9, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

The rear lens unit, in order from the object side to the image side, comprises: a focusing lens unit G2 which has positive optical power, and moves to the object side along the optical axis in focusing from an infinity in-focus condition to a close-object in-focus condition to perform focusing; and a fixed lens unit G3 which has negative optical power, and does not move along the optical axis but is fixed in focusing.

The focusing lens unit G2, in order from the object side to the image side, comprises: a positive meniscus third lens element L3 with the convex surface facing the object side; a negative meniscus fourth lens element L4 with the convex surface facing the image side; a positive meniscus fifth lens element L5 with the convex surface facing the image side; and a bi-convex sixth lens element L6 with the convex surface of greater curvature facing the image side. The fourth lens element L4 and the fifth lens element L5 are cemented with each other. In the surface data of the corresponding Numerical Example described later, surface number 10 is imparted to an adhesive layer between the fourth lens element L4 and the fifth lens element L5. The sixth lens element L6 has two aspheric surfaces.

The fixed lens unit G3 comprises solely a negative meniscus seventh lens element L7 with the convex surface facing the image side. The seventh lens element L7 has an aspheric object side surface.

A flare-cut diaphragm is provided on the image side relative to the aperture diaphragm A. In the surface data of the corresponding Numerical Example described later, surface number 6 is imparted to the flare-cut diaphragm.

Embodiment 6

Figure 11:
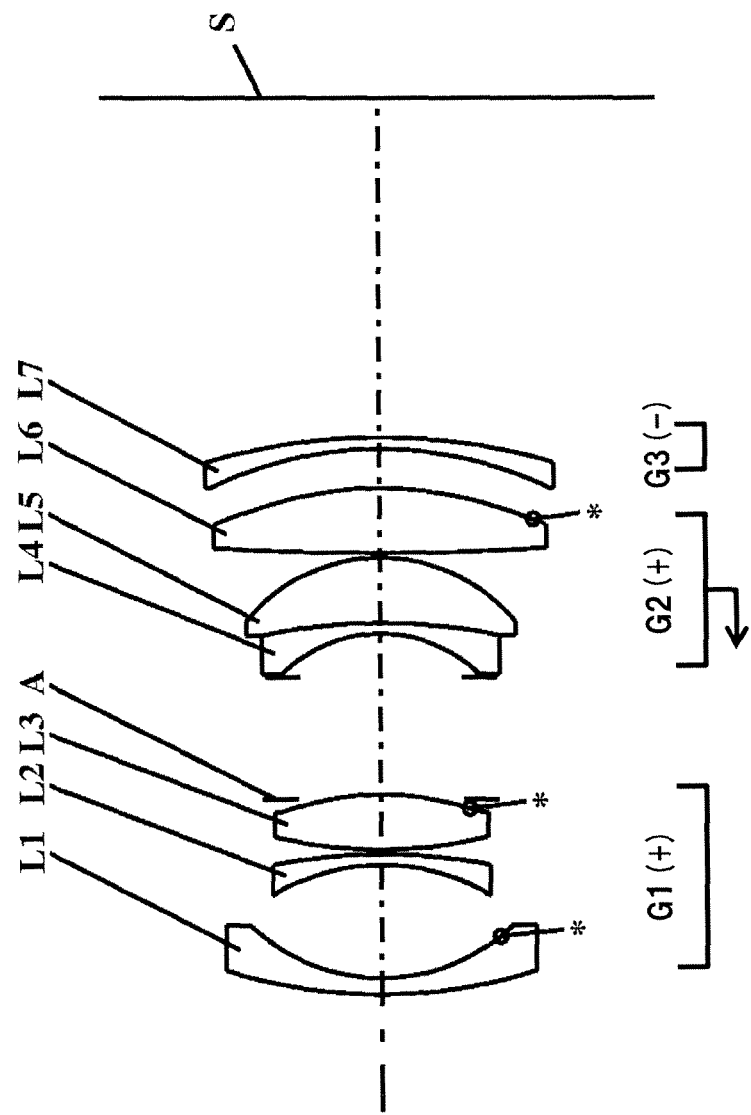
FIG. 11 is a lens arrangement diagram showing an infinity in-focus condition of a single focal length lens system according to Embodiment 6 (Numerical Example 6)
Figure 12:
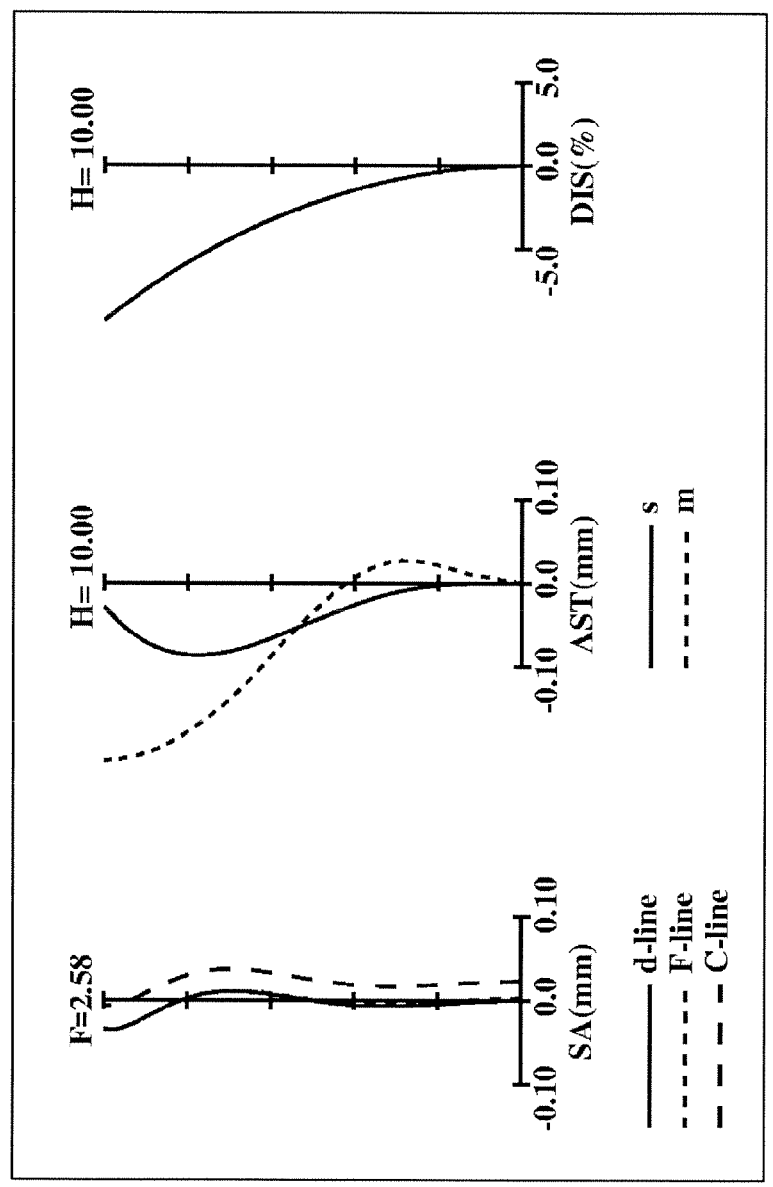
FIG. 12 is a longitudinal aberration diagram of an infinity in-focus condition of a single focal length lens system according to Numerical Example 6.

As shown in FIG. 11, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; a negative meniscus second lens element L2 with the convex surface facing the image side; and a bi-convex third lens element L3 with the convex surface of greater curvature facing the image side. The first lens element L1 has an aspheric image side surface, and the third lens element L3 has an aspheric image side surface.

The rear lens unit, in order from the object side to the image side, comprises: a focusing lens unit G2 which has positive optical power, and moves to the object side along the optical axis in focusing from an infinity in-focus condition to a close-object in-focus condition to perform focusing; and a fixed lens unit G3 which has negative optical power, and does not move along the optical axis but is fixed in focusing.

The focusing lens unit G2, in order from the object side to the image side, comprises: a negative meniscus fourth lens element L4 with the convex surface facing the image side; a positive meniscus fifth lens element L5 with the convex surface facing the image side; and a bi-convex sixth lens element L6 with the convex surface of greater curvature facing the image side. The fourth lens element L4 and the fifth lens element L5 are cemented with each other. In the surface data of the corresponding Numerical Example described later, surface number 10 is imparted to an adhesive layer between the fourth lens element L4 and the fifth lens element L5. The sixth lens element L6 has an aspheric image side surface.

The fixed lens unit G3 comprises solely a negative meniscus seventh lens element L7 with the convex surface facing the image side.

A flare-cut diaphragm is provided on the image side relative to the aperture diaphragm A. In the surface data of the corresponding Numerical Example described later, surface number 8 is imparted to the flare-cut diaphragm.

Embodiment 7

Figure 13:
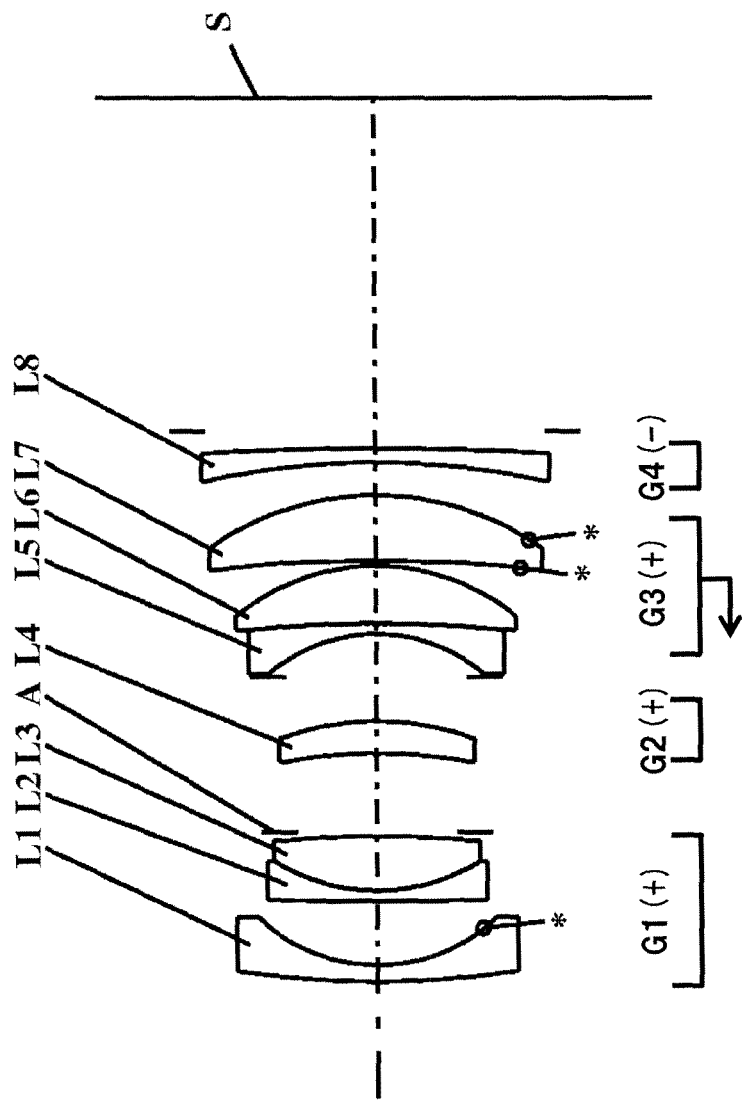
FIG. 13 is a lens arrangement diagram showing an infinity in-focus condition of a single focal length lens system according to Embodiment 7 (Numerical Example 7)
Figure 14:
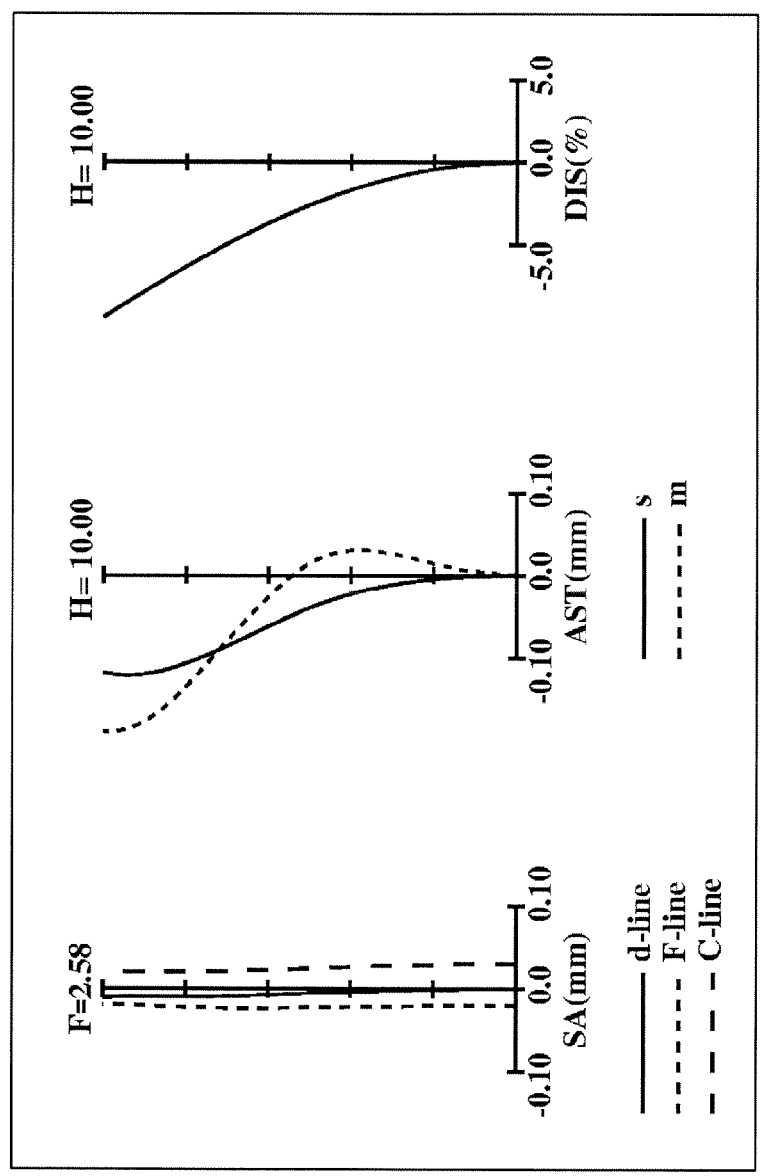
FIG. 14 is a longitudinal aberration diagram of an infinity in-focus condition of a single focal length lens system according to Numerical Example 7.

As shown in FIG. 13, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; a negative meniscus second lens element L2 with the convex surface facing the object side; and a bi-convex third lens element L3 with the convex surface of greater curvature facing the object side. The second lens element L2 and the third lens element L3 are cemented with each other. In the surface data of the corresponding Numerical Example described later, surface number 4 is imparted to an adhesive layer between the second lens element L2 and the third lens element L3. The first lens element L1 has an aspheric image side surface.

The rear lens unit, in order from the object side to the image side, comprises: a fixed lens unit G2 which has positive optical power, and does not move along the optical axis but is fixed in focusing from an infinity in-focus condition to a close-object in-focus condition; a focusing lens unit G3 which has positive optical power, and moves to the object side along the optical axis in focusing to perform focusing; and a fixed lens unit G4 which has negative optical power, and does not move along the optical axis but is fixed in focusing.

The fixed lens unit G2 comprises solely a positive meniscus fourth lens element L4 with the convex surface facing the image side.

The focusing lens unit G3, in order from the object side to the image side, comprises: a negative meniscus fifth lens element L5 with the convex surface facing the image side; a positive meniscus sixth lens element L6 with the convex surface facing the image side; and a positive meniscus seventh lens element L7 with the convex surface facing the image side. The fifth lens element L5 and the sixth lens element L6 are cemented with each other. In the surface data of the corresponding Numerical Example described later, surface number 12 is imparted to an adhesive layer between the fifth lens element L5 and the sixth lens element L6. The seventh lens element L7 has two aspheric surfaces.

The fixed lens unit G4 comprises solely a negative meniscus eighth lens element L8 with the convex surface facing the image side.

Two flare-cut diaphragms are provided on the image side relative to the aperture diaphragm A. In the surface data of the corresponding Numerical Example described later, surface numbers 10 and 19 are imparted to the flare-cut diaphragms.

Embodiment 8

Figure 15:
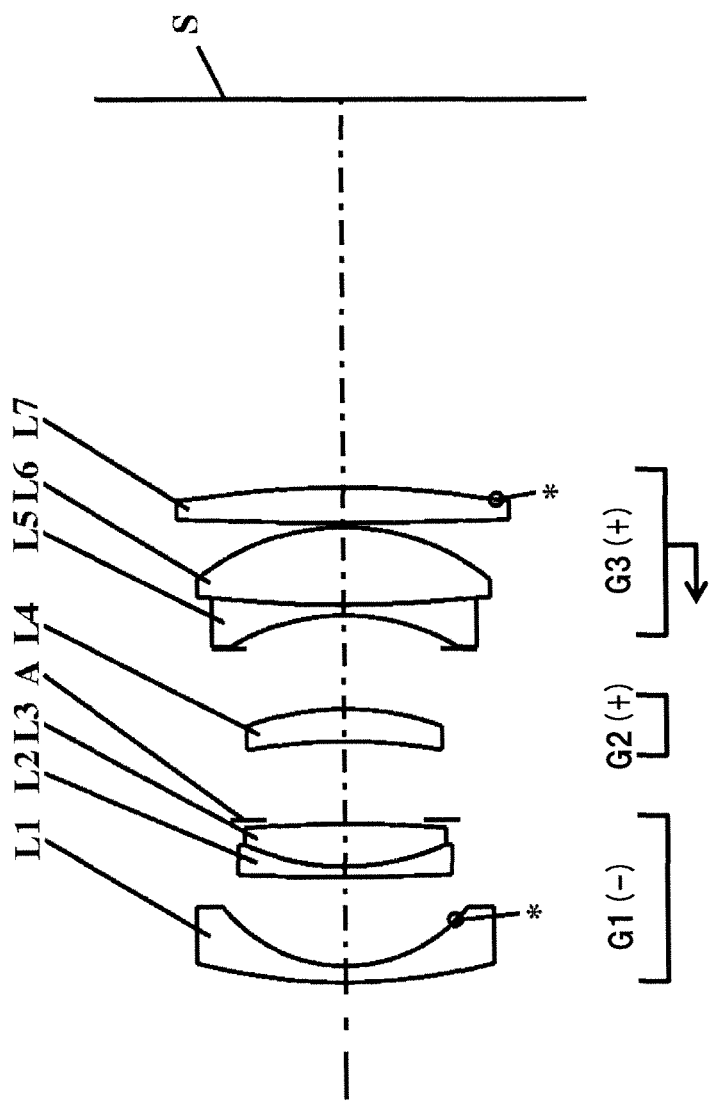
FIG. 15 is a lens arrangement diagram showing an infinity in-focus condition of a single focal length lens system according to Embodiment 8 (Numerical Example 8)
Figure 16:
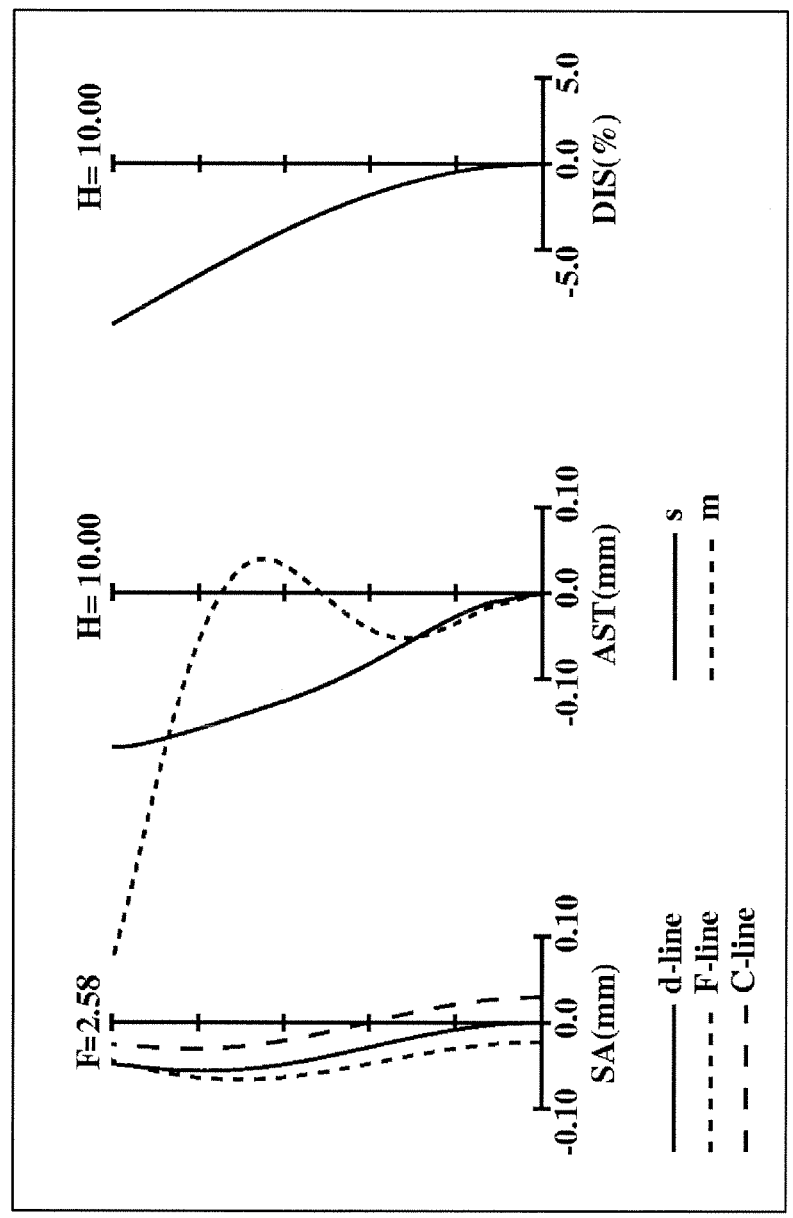
FIG. 16 is a longitudinal aberration diagram of an infinity in-focus condition of a single focal length lens system according to Numerical Example 8.

As shown in FIG. 15, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; a negative meniscus second lens element L2 with the convex surface facing the object side; and a bi-convex third lens element L3 with the convex surface of greater curvature facing the object side. The second lens element L2 and the third lens element L3 are cemented with each other. In the surface data of the corresponding Numerical Example described later, surface number 4 is imparted to an adhesive layer between the second lens element L2 and the third lens element L3. The first lens element L1 has an aspheric image side surface.

The rear lens unit, in order from the object side to the image side, comprises: a fixed lens unit G2 which has positive optical power, and does not move along the optical axis but is fixed in focusing from an infinity in-focus condition to a close-object in-focus condition; and a focusing lens unit G3 which has positive optical power, and moves to the object side along the optical axis in focusing to perform focusing.

The fixed lens unit G2 comprises solely a positive meniscus fourth lens element L4 with the convex surface facing the image side.

The focusing lens unit G3, in order from the object side to the image side, comprises: a bi-concave fifth lens element L5 with the concave surface of greater curvature facing the object side; a bi-convex sixth lens element L6 with the convex surface of greater curvature facing the image side; and a bi-convex seventh lens element L7 with the convex surface of greater curvature facing the image side. The fifth lens element L5 and the sixth lens element L6 are cemented with each other. In the surface data of the corresponding Numerical Example described later, surface number 12 is imparted to an adhesive layer between the fifth lens element L5 and the sixth lens element L6. The seventh lens element L7 has an aspheric image side surface.

A flare-cut diaphragm is provided on the image side relative to the aperture diaphragm A. In the surface data of the corresponding Numerical Example described later, surface number 10 is imparted to the flare-cut diaphragm.

Embodiment 9

Figure 17:
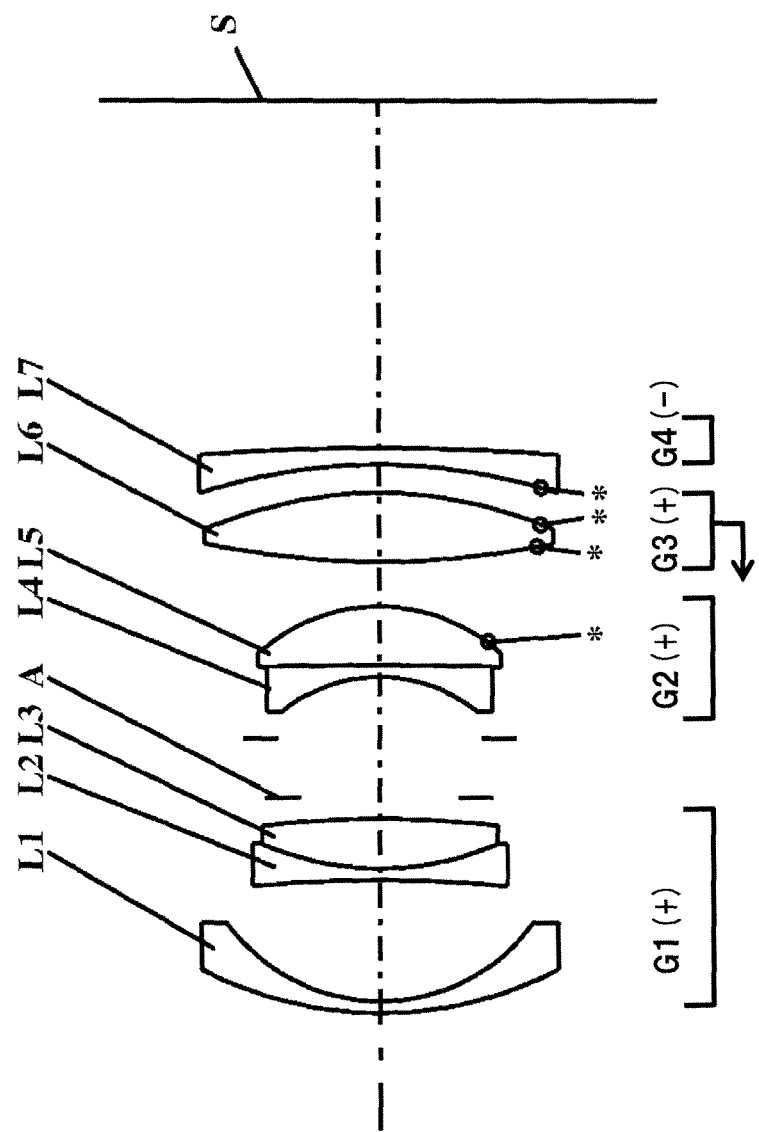
FIG. 17 is a lens arrangement diagram showing an infinity in-focus condition of a single focal length lens system according to Embodiment 9 (Numerical Example 9)
Figure 18:
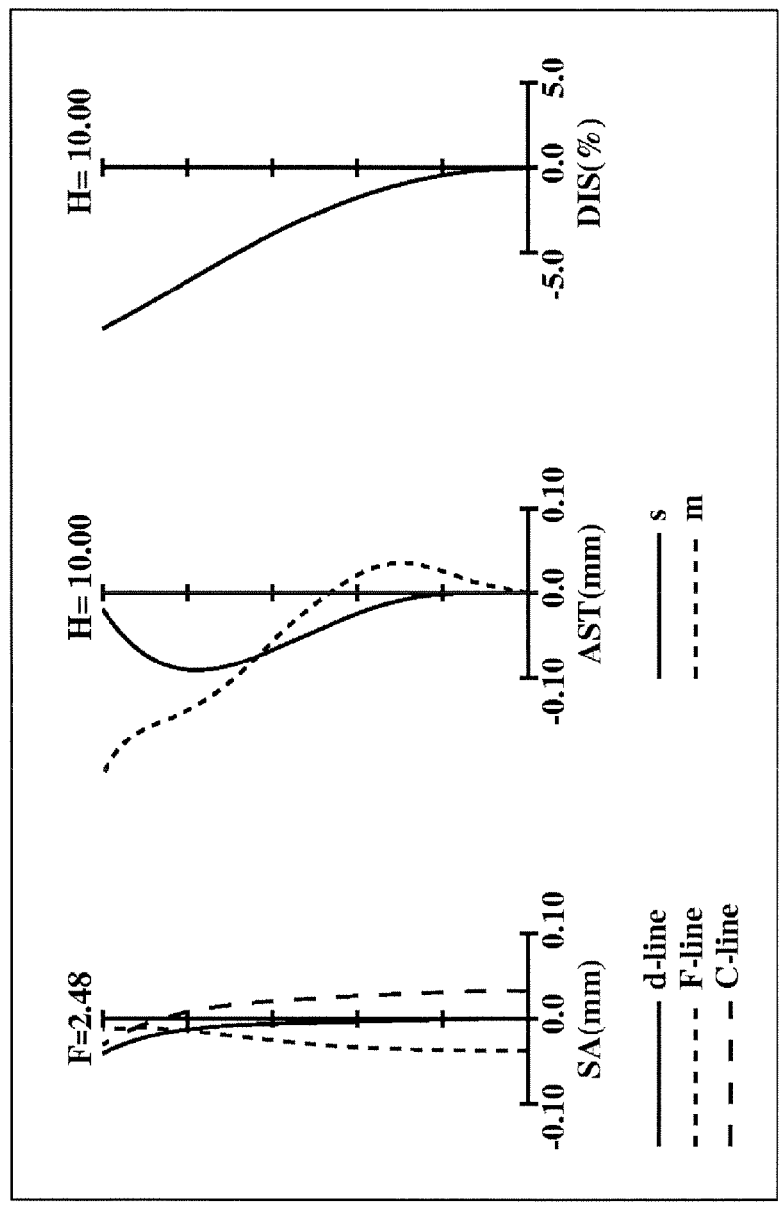
FIG. 18 is a longitudinal aberration diagram of an infinity in-focus condition of a single focal length lens system according to Numerical Example 9.

As shown in FIG. 17, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; a bi-concave second lens element L2 with the concave surface of greater curvature facing the image side; and a bi-convex third lens element L3 with the convex surface of greater curvature facing the object side. The second lens element L2 and the third lens element L3 are cemented with each other.

The rear lens unit, in order from the object side to the image side, comprises: a fixed lens unit G2 which has positive optical power, and does not move along the optical axis but is fixed in focusing from an infinity in-focus condition to a close-object in-focus condition; a focusing lens unit G3 which has positive optical power, and moves to the object side along the optical axis in focusing to perform focusing; and a fixed lens unit G4 which has negative optical power, and does not move along the optical axis but is fixed in focusing.

The fixed lens unit G2, in order from the object side to the image side, comprises: a negative meniscus fourth lens element L4 with the convex surface facing the image side; and a positive meniscus fifth lens element L5 with the convex surface facing the image side. The fourth lens element L4 and the fifth lens element L5 are cemented with each other. The fifth lens element L5 has an aspheric image side surface.

The focusing lens unit G3 comprises solely a bi-convex sixth lens element L6 with the convex surface of greater curvature facing the image side. The sixth lens element L6 has two aspheric surfaces.

The fixed lens unit G4 comprises solely a negative meniscus seventh lens element L7 with the convex surface facing the image side. The seventh lens element L7 has an aspheric object side surface.

A flare-cut diaphragm is provided on the image side relative to the aperture diaphragm A. In the surface data of the corresponding Numerical Example described later, surface number 7 is imparted to the flare-cut diaphragm.

Embodiment 10

Figure 19:
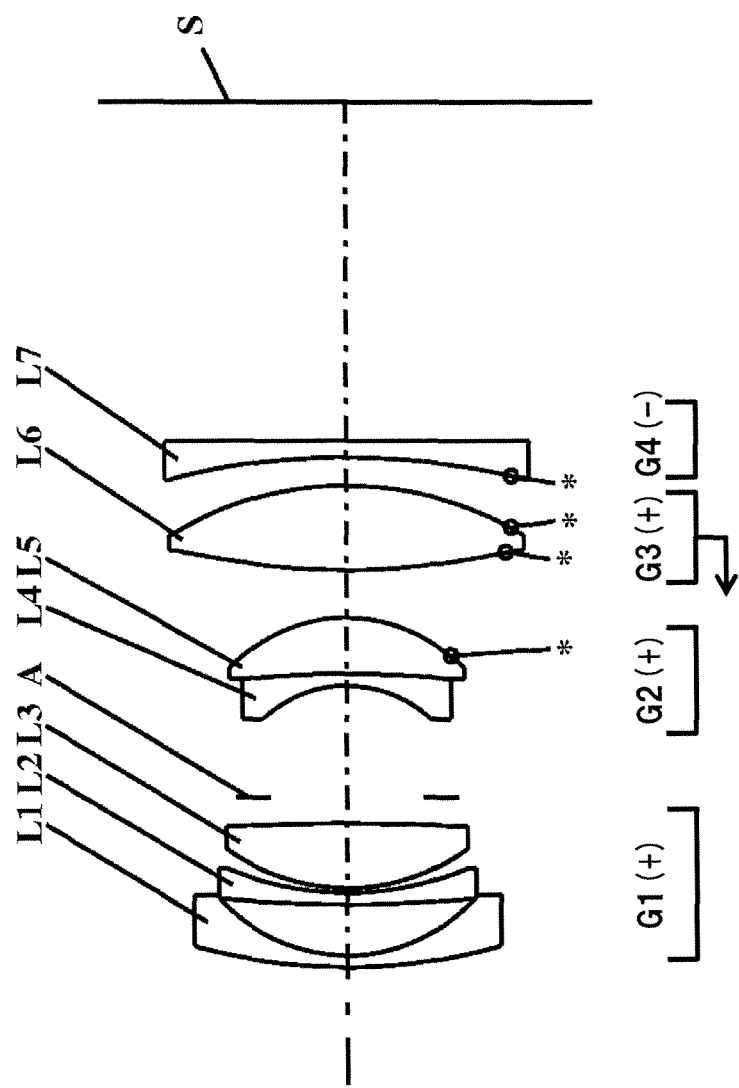
FIG. 19 is a lens arrangement diagram showing an infinity in-focus condition of a single focal length lens system according to Embodiment 10 (Numerical Example 10)
Figure 20:
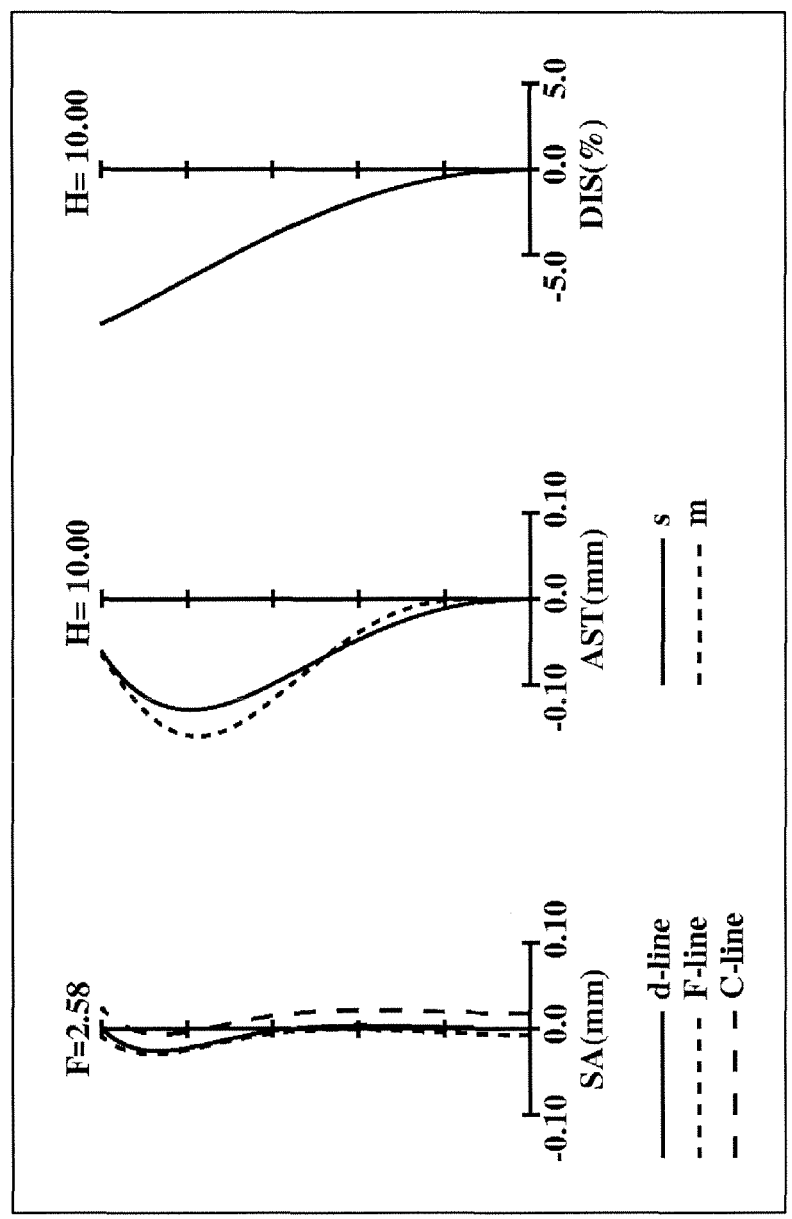
FIG. 20 is a longitudinal aberration diagram of an infinity in-focus condition of a single focal length lens system according to Numerical Example 10.

As shown in FIG. 19, the front lens unit G1 does not move along the optical axis but is fixed in focusing from an infinity in-focus condition to a close-object in-focus condition. The front lens unit G1, in order from the object side to the image side, comprises: a negative meniscus first lens element L1 with the convex surface facing the object side; a negative meniscus second lens element L2 with the convex surface facing the object side; and a bi-convex third lens element L3 with the convex surface of greater curvature facing the object side.

The rear lens unit, in order from the object side to the image side, comprises: a fixed lens unit G2 which has positive optical power, and does not move along the optical axis but is fixed in focusing from an infinity in-focus condition to a close-object in-focus condition; a focusing lens unit G3 which has positive optical power, and moves to the object side along the optical axis in focusing to perform focusing; and a fixed lens unit G4 which has negative optical power, and does not move along the optical axis but is fixed in focusing.

The fixed lens unit G2, in order from the object side to the image side, comprises: a negative meniscus fourth lens element L4 with the convex surface facing the image side; and a positive meniscus fifth lens element L5 with the convex surface facing the image side. The fourth lens element L4 and the fifth lens element L5 are cemented with each other. In the surface data of the corresponding Numerical Example described later, surface number 9 is imparted to an adhesive layer between the fourth lens element L4 and the fifth lens element L5. The fifth lens element L5 has an aspheric image side surface.

The focusing lens unit G3 comprises solely a bi-convex sixth lens element L6 with the convex surface of greater curvature facing the image side. The sixth lens element L6 has two aspheric surfaces.

The fixed lens unit G4 comprises solely a plano-concave seventh lens element L7 with the concave surface facing the object side. The seventh lens element L7 has an aspheric object side surface.

The following description is given for beneficial conditions that a single focal length lens system like the single focal length lens systems according to Embodiments 1 to 10 can satisfy. Here, a plurality of beneficial conditions are set forth for the single focal length lens system according to each embodiment. A construction that satisfies all the plurality of conditions is most effective for the single focal length lens system. However, when an individual condition is satisfied, a single focal length lens system having the corresponding effect is obtained.

For example, in a single focal length lens system like the single focal length lens systems according to Embodiments 1 to 10, which comprises, in order from the object side to the image side, a front lens unit, an aperture diaphragm, and a rear lens unit composed of a plurality of lens units, and in which the front lens unit comprises three or less lens elements including a negative lens element that has negative optical power and is located closest to the object side, and a positive lens element that has positive optical power and is located on the image side relative to the negative lens element, and in which the front lens unit does not move along the optical axis but is fixed in focusing from an infinity in-focus condition to a close-object in-focus condition, and in which the rear lens unit includes a focusing lens unit which moves along the optical axis in focusing, and a fixed lens unit which does not move along the optical axis but is fixed in focusing (this lens configuration is referred to as a basic configuration of the embodiments, hereinafter), the following conditions (1), (2), and (3) are satisfied:

$$0.4 < f_W/f_{GF} < 1.5 \quad (1)$$

$$0.9 < f_W/T_1 < 4.5 \quad (2)$$

$$-0.3 < f_W/f_{G1} < 0.3 \quad (3)$$

where
$f_W$ is a focal length of the entire single focal length lens system in an infinity in-focus condition,
$f_{GF}$ is a focal length of the focusing lens unit,
$T_1$ is an optical axial distance from an object side lens surface of the negative lens element in the front lens unit to the aperture diaphragm, and
$f_{G1}$ is a focal length of the front lens unit.

The condition (1) sets forth the relationship between the focal length of the entire single focal length lens system and the focal length of the focusing lens unit. When the value exceeds the upper limit of the condition (1), the optical power of the focusing lens unit increases, and thereby deterioration sensitivity of optical performance to a manufacturing error increases. As a result, the level of manufacturing difficulty increases, which causes increase in the manufacturing cost. When the value goes below the lower limit of the condition (1), the amount of draw-out of the focusing lens unit becomes large, which causes increase in the overall length of the lens system.

When at least one of the following conditions (1-1)' and (1-1)" is satisfied, the above-mentioned effect is achieved more successfully.

$$0.60 < f_W/f_{GF} \quad (1\text{-}1)'$$

$$f_W/f_{GF} < 1.35 \quad (1\text{-}1)''$$

Further, when at least one of the following conditions (1-2)' and (1-2)" is satisfied, the above-mentioned effect is achieved still more successfully.

$$0.8 < f_W/f_{GF} \quad (1\text{-}2)'$$

$$f_W/f_{GF} < 1.2 \quad (1\text{-}2)''$$

The condition (2) sets forth the relationship between the focal length of the entire single focal length lens system and the optical axial distance from the most object side lens surface of the entire single focal length lens system to the aperture diaphragm. When the value exceeds the upper limit of the condition (2), the thickness of the front lens unit becomes insufficient, and thereby compensation of curvature of field and coma aberration in the peripheral part of the image becomes insufficient. When the value goes below the lower limit of the condition (2), the overall length of the lens system increases, and therefore, size-reduction of the single focal length lens system cannot be realized.

When at least one of the following conditions (2-1)' and (2-1)" is satisfied, the above-mentioned effect is achieved more successfully.

$$1.2 < f_W/T_1 \quad (2\text{-}1)'$$

$$f_W/T_1 < 3.5 \quad (2\text{-}1)''$$

Further, when at least one of the following conditions (2-2)' and (2-2)" is satisfied, the above-mentioned effect is achieved still more successfully.

$$1.5 < f_W/T_1 \quad (2\text{-}2)'$$

$$f_W/T_1 < 2.5 \quad (2\text{-}2)''$$

The condition (3) sets forth the relationship between the focal length of the entire single focal length lens system and the focal length of the front lens unit. When the value exceeds the upper limit of the condition (3), the outer diameter of the front lens unit increases, and thereby compensation of coma aberration in the peripheral part of the image becomes difficult, and further, the overall length of the lens system increases. When the value goes below the lower limit of the condition (3), barrel type distortion occurs prominently. In addition, a focusing lens unit having high optical power is needed, and thereby sensitivity to a manufacturing error increases.

When the following condition (3-1)' is satisfied, the above-mentioned effect is achieved more successfully.

$$-0.2 < f_W/f_{G1} \quad (3\text{-}1)'$$

Further, when at least one of the following conditions (3-2)' and (3-2)" is satisfied, the above-mentioned effect is achieved still more successfully.

$$-0.10 < f_W/f_{G1} \quad (3\text{-}2)'$$

$$f_W/f_{G1} < 0.15 \quad (3\text{-}2)''$$

It is beneficial that, in a single focal length lens system having the basic configuration like the single focal length lens systems according to Embodiments 1 to 10, a negative lens element located closest to the object side in the front lens unit satisfies the following condition (4).

$$0.7 < (R_{11}+R_{12})/(R_{11}-R_{12}) < 3.5 \quad (4)$$

where $R_{11}$ is a radius of curvature of an object side lens surface of the negative lens element, and $R_{12}$ is a radius of curvature of an image side lens surface of the negative lens element.

The condition (4) sets forth the relationship between the radius of curvature of the object side lens surface of the negative lens element located closest to the object side in the front lens unit, i.e., located closest to the object side in the single focal length lens system, and the radius of curvature of the image side lens surface of the negative lens element. When the value exceeds the upper limit of the condition (4), compensation of coma aberration in the peripheral part of the image becomes insufficient, and the overall length of the lens system might increase. When the value goes below the lower limit of the condition (4), compensation of barrel type distortion might be insufficient.

When at least one of the following conditions (4-1)' and (4-1)" is satisfied, the above-mentioned effect is achieved more successfully.

$$0.8 < (R_{11}+R_{12})/(R_{11}-R_{12}) \quad (4\text{-}1)'$$

$$(R_{11}+R_{12})/(R_{11}-R_{12}) < 2.6 \quad (4\text{-}1)''$$

Further, when at least one of the following conditions (4-2)' and (4-2)" is satisfied, the above-mentioned effect is achieved still more successfully.

$$0.9 < (R_{11}+R_{12})/(R_{11}-R_{12}) \quad (4\text{-}2)'$$

$$(R_{11}+R_{12})/(R_{11}-R_{12}) < 1.7 \quad (4\text{-}2)''$$

In the single focal length lens systems according to Embodiments 1 to 10, since the focusing lens unit has at least one aspheric surface, spherical aberration and coma aberration can be satisfactorily compensated from an infinity object point to a close object point, and thereby the performance in the vicinity of the center of the screen is enhanced.

In the single focal length lens systems according to Embodiments 1 to 8, since the front lens unit has at least one aspheric surface, astigmatism in the peripheral part of the image can be satisfactorily compensated with the thickness of the front lens unit in the optical axis direction being reduced.

The individual lens units constituting the single focal length lens systems according to Embodiments 1 to 10 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium.

Although there are no clear descriptions in Embodiments 1 to 10, a plane parallel plate substantially having no optical power, such as an optical low-pass filter or a face plate of an image sensor, or a microlens array for increasing aperture efficiency of the image sensor can be provided between the image surface S and the lens system.

As described above, Embodiments 1 to 10 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

Embodiment 11

Figure 21:
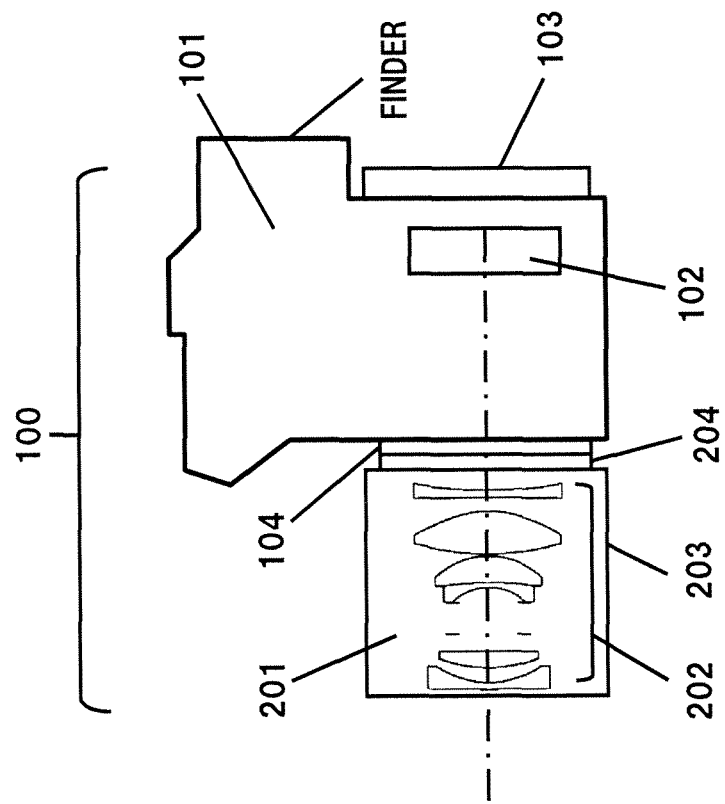
FIG. 21 is a schematic construction diagram of an interchangeable-lens type digital camera system according to Embodiment 11.

FIG. 21 is a schematic construction diagram of an interchangeable-lens type digital camera system according to Embodiment 11.

The interchangeable-lens type digital camera system 100 according to Embodiment 11 includes a camera body 101, and an interchangeable lens apparatus 201 which is detachably connected to the camera body 101.

The camera body 101 includes: an image sensor 102 which receives an optical image formed by a single focal length lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a single focal length lens system 202 according to any of Embodiments 1 to 10; a lens barrel 203 which holds the single focal length lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 21, the single focal length lens system according to Embodiment 1 is employed as the single focal length lens system 202.

In Embodiment 11, since the single focal length lens system 202 according to any of Embodiments 1 to 10 is employed, a compact interchangeable lens apparatus having excellent imaging performance can be realized at low cost. Moreover, size reduction and cost reduction of the entire camera system 100 according to Embodiment 11 can be achieved.

As described above, Embodiment 11 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the single focal length lens systems according to Embodiments 1 to 10 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1 + \kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, $\kappa$ is a conic constant, and $A_n$ is an n-th order aspherical coefficient.

FIGS. 2, 4, 6, 8, 10, 12, 14, 16, 18, and 20 are longitudinal aberration diagrams of an infinity in-focus condition of the single focal length lens systems according to Numerical Examples 1 to 10, respectively.

Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

NUMERICAL EXAMPLE 1

The single focal length lens system of Numerical Example 1 corresponds to Embodiment 1 shown in FIG. 1. Table 1 shows the surface data of the single focal length lens system. Table 2 shows the aspherical data. Table 3 shows various data.

TABLE 1

(Surface data)

| Surface number | r | d | nd | vd | Effective diameter |
|---|---|---|---|---|---|
| Object surface | ∞ | | | | |
| 1* | 150.13690 | 0.70000 | 1.58332 | 59.1 | 6.069 |
| 2* | 9.13930 | 1.58250 | | | 5.160 |

TABLE 1-continued (Surface data)

| Surface number | r | d | nd | vd | Effective diameter |
|---|---|---|---|---|---|
| 3 | 14.91730 | 1.73000 | 1.91082 | 35.2 | 4.829 |
| 4 | 408.02380 | 1.86300 | | | 5.036 |
| 5(Diaphragm) | ∞ | 3.28380 | | | 3.110 |
| 6 | ∞ | 1.64960 | | | 3.100 |
| 7 | −5.73120 | 0.50000 | 1.84666 | 23.8 | 3.396 |
| 8 | −35.00000 | 0.01000 | 1.56732 | 42.8 | 4.346 |
| 9 | −35.00000 | 2.83000 | 1.88300 | 40.8 | 4.353 |
| 10 | −8.35190 | 0.20000 | | | 5.227 |
| 11* | 25.08330 | 4.58000 | 1.58250 | 59.4 | 7.073 |
| 12* | −10.86000 | 1.45000 | | | 7.371 |
| 13 | −611.69690 | 0.80000 | 1.68400 | 31.3 | 7.490 |
| 14* | 44.68010 | (BF) | | | 7.526 |
| Image surface | ∞ | | | | |

TABLE 2

(Aspherical data)

Surface No. 1

K = 0.00000E+00, A4 = −3.85000E−05, A6 = 1.82000E−06,
A8 = −9.53000E−08 A10 = 1.88000E−09, A12 = −1.12000E−11

Surface No. 2

K = 0.00000E+00, A4 = −1.30000E−04, A6 = −6.84000E−07,
A8 = −3.09000E−08 A10 = −2.92000E−09, A12 = 9.26000E−11

Surface No. 11

K = 0.00000E+00, A4 = −1.88000E−05, A6 = −7.59000E−07,
A8 = 2.03000E−08 A10 = −1.45000E−10, A12 = 0.00000E+00

Surface No. 12

K = 0.00000E+00, A4 = 2.69000E−04, A6 = −4.50000E−06,
A8 = 1.05000E−07 A10 = −1.05000E−09, A12 = 4.67000E−12

Surface No. 14

K = 0.00000E+00, A4 = −9.05000E−05, A6 = 4.19000E−06,
A8 = −8.41000E−08 A10 = 9.16000E−10, A12 = −4.09000E−12

TABLE 3

(Various data)

| Focal length | 14.5457 |
|---|---|
| F-number | 2.52134 |
| View angle | 37.8597 |
| Image height | 10.2000 |
| Overall length of lens system | 37.3188 |
| BF | 16.1399 |

NUMERICAL EXAMPLE 2

The single focal length lens system of Numerical Example 2 corresponds to Embodiment 2 shown in FIG. 3. Table 4 shows the surface data of the single focal length lens system. Table 5 shows the aspherical data. Table 6 shows various data.

TABLE 4

(Surface data)

| Surface number | r | d | nd | vd | Effective diameter |
|---|---|---|---|---|---|
| Object surface | ∞ | | | | |
| 1 | 51.95710 | 0.50000 | 1.48749 | 70.4 | 8.440 |
| 2 | 9.15460 | 3.31060 | | | 6.897 |

TABLE 4-continued (Surface data)

| Surface number | r | d | nd | vd | Effective diameter |
|---|---|---|---|---|---|
| 3* | 15.40980 | 2.62080 | 1.80825 | 40.9 | 6.410 |
| 4* | 68.26990 | 3.98100 | | | 6.249 |
| 5(Diaphragm) | ∞ | 3.56320 | | | 3.123 |
| 6 | ∞ | 1.57460 | | | 3.188 |
| 7 | −6.12570 | 0.50000 | 1.75211 | 25.0 | 3.462 |
| 8 | 229.16700 | 2.75880 | 1.88300 | 40.8 | 4.557 |
| 9 | −10.18170 | 0.20000 | | | 5.308 |
| 10* | 32.73300 | 4.21140 | 1.66547 | 55.2 | 6.772 |
| 11* | −11.63770 | 2.42630 | | | 7.126 |
| 12* | −286.45650 | 0.90000 | 1.68400 | 31.3 | 7.472 |
| 13 | 53.16900 | (BF) | | | 7.416 |
| Image surface | ∞ | | | | |

TABLE 5

(Aspherical data)

Surface No. 3

K = 0.00000E+00, A4 = 1.99000E−05, A6 = 4.70000E−06,
A8 = −1.98000E−07 A10 = 3.95000E−09, A12 = −3.40000E−11,
A14 = 0.00000E+00
Surface No. 4

K = 0.00000E+00, A4 = −4.01000E−05, A6 = 1.06000E−05,
A8 = −8.67000E−07 A10 = 3.37000E−08, A12 = −6.64000E−10,
A14 = 5.11000E−12
Surface No. 10

K = 0.00000E+00, A4 = −2.71000E−05, A6 = 9.65000E−07,
A8 = −2.36000E−08 A10 = 1.99000E−10, A12 = 0.00000E+00,
A14 = 0.00000E+00
Surface No. 11

K = 0.00000E+00, A4 = 1.72000E−04, A6 = −7.87000E−07,
A8 = 3.15000E−08 A10 = −5.60000E−10, A12 = 4.20000E−12,
A14 = 0.00000E+00
Surface No. 12

K = 0.00000E+00, A4 = 3.96000E−05, A6 = −1.24000E−06,
A8 = 1.41000E−08 A10 = −8.76000E−11, A12 = 2.33000E−13,
A14 = 0.00000E+00

TABLE 6

(Various data)

| | |
|---|---|
| Focal length | 14.4998 |
| F-number | 2.58001 |
| View angle | 37.2105 |
| Image height | 10.0000 |
| Overall length of lens system | 41.6988 |
| BF | 15.1521 |

NUMERICAL EXAMPLE 3

The single focal length lens system of Numerical Example 3 corresponds to Embodiment 3 shown in FIG. 5. Table 7 shows the surface data of the single focal length lens system. Table 8 shows the aspherical data. Table 9 shows various data.

TABLE 7

(Surface data)

| Surface number | r | d | nd | vd | Effective diameter |
|---|---|---|---|---|---|
| Object surface | ∞ | | | | |
| 1* | −303.92490 | 0.70000 | 1.58332 | 59.1 | 5.970 |
| 2* | 12.88600 | 2.34940 | | | 5.237 |
| 3 | 21.67310 | 1.47070 | 1.90366 | 31.3 | 4.500 |
| 4 | −106.29270 | 1.35180 | | | 4.979 |
| 5(Diaphragm) | ∞ | 3.46350 | | | 3.098 |
| 6 | ∞ | 1.74370 | | | 3.082 |
| 7 | −5.56740 | 0.50000 | 1.75211 | 25.0 | 3.416 |
| 8 | −48.00860 | 0.01000 | 1.56732 | 42.8 | 4.453 |
| 9 | −48.00860 | 2.81780 | 1.80420 | 46.5 | 4.460 |
| 10 | −8.60140 | 0.20000 | | | 5.287 |
| 11* | 35.42730 | 4.30000 | 1.66547 | 55.2 | 6.895 |
| 12* | −10.81740 | 1.60000 | | | 7.239 |
| 13 | 244.83460 | 0.80000 | 1.68400 | 31.3 | 7.333 |
| 14* | 30.30140 | (BF) | | | 7.336 |
| Image surface | ∞ | | | | |

TABLE 8

(Aspherical data)

Surface No. 1

K = 0.00000E+00, A4 = 5.18000E−05, A6 = −6.56000E−06,
A8 = 2.59000E−07 A10 = −5.38000E−09, A12 = 4.54000E−11
Surface No. 2

K = 0.00000E+00, A4 = 3.56000E−05, A6 = −1.33000E−05,
A8 = 6.63000E−07 A10 = −1.85000E−08, A12 = 2.11000E−10
Surface No. 11

K = 0.00000E+00, A4 = −2.67000E−05, A6 = −5.47000E−07,
A8 = 1.31000E−08 A10 = −7.08000E−11, A12 = 0.00000E+00
Surface No. 12

K = 0.00000E+00, A4 = 2.16000E−04, A6 = −3.18000E−06,
A8 = 7.85000E−08 A10 = −8.44000E−10, A12 = 4.55000E−12
Surface No. 14

K = 0.00000E+00, A4 = −7.15000E−05, A6 = 3.59000E−06,
A8 = −7.29000E−08 A10 = 7.96000E−10, A12 = −3.52000E−12

TABLE 9

(Various data)

| | |
|---|---|
| Focal length | 14.5502 |
| F-number | 2.58104 |
| View angle | 37.1364 |
| Image height | 10.0000 |
| Overall length of lens system | 37.1796 |
| BF | 15.8727 |

NUMERICAL EXAMPLE 4

The single focal length lens system of Numerical Example 4 corresponds to Embodiment 4 shown in FIG. 7. Table 10 shows the surface data of the single focal length lens system. Table 11 shows the aspherical data. Table 12 shows various data.

TABLE 10

(Surface data)

| Surface number | r | d | nd | vd | Effective diameter |
|---|---|---|---|---|---|
| Object surface | ∞ | | | | |
| 1* | 41.90990 | 0.70000 | 1.60602 | 57.4 | 7.016 |
| 2* | 8.23160 | 3.24320 | | | 5.848 |
| 3 | 12.63910 | 2.01080 | 1.80450 | 39.6 | 5.110 |
| 4 | 112.86900 | 2.01980 | | | 4.716 |
| 5(Diaphragm) | ∞ | 3.68080 | | | 3.250 |
| 6 | ∞ | 1.69840 | | | 3.250 |
| 7 | −5.76040 | 0.45000 | 1.74077 | 27.8 | 3.483 |
| 8 | −87.78370 | 0.01000 | 1.56732 | 42.8 | 4.346 |
| 9 | −87.78370 | 2.65120 | 1.80420 | 46.5 | 4.352 |
| 10 | −8.16850 | 0.20000 | | | 5.027 |
| 11* | 24.50540 | 4.40000 | 1.60602 | 57.4 | 6.568 |
| 12* | −11.06420 | 1.88940 | | | 6.900 |
| 13* | −19.98820 | 0.70000 | 1.68400 | 31.3 | 6.955 |
| 14 | −105.11770 | (BF) | | | 7.203 |
| Image surface | ∞ | | | | |

TABLE 11

(Aspherical data)

Surface No. 1

K = 0.00000E+00, A4 = −1.85000E−04, A6 = 4.42000E−06, A8 = −5.27000E−08 A10 = 2.86000E−10

Surface No. 2

K = 0.00000E+00, A4 = −2.87000E−04, A6 = −3.56000E−07, A8 = 6.41000E−08 A10 = −1.14000E−09

Surface No. 11

K = 0.00000E+00, A4 = −6.37000E−05, A6 = 3.64000E−07, A8 = −2.81000E−09 A10 = 3.77000E−11

Surface No. 12

K = 0.00000E+00, A4 = 1.47000E−04, A6 = 8.71000E−07, A8 = −1.25000E−08 A10 = 1.53000E−10

Surface No. 13

K = 2.83000E+00, A4 = 5.75000E−05, A6 = 7.16000E−07, A8 = −7.82000E−09 A10 = 8.78000E−11

TABLE 12

(Various data)

| | |
|---|---|
| Focal length | 14.4499 |
| F-number | 2.58048 |
| View angle | 37.2974 |
| Image height | 10.0000 |
| Overall length of lens system | 38.6988 |
| BF | 15.0452 |

TABLE 13

(Surface data)

| Surface number | r | d | nd | vd | Effective diameter |
|---|---|---|---|---|---|
| Object surface | ∞ | | | | |
| 1* | 40.00000 | 0.70000 | 1.60602 | 57.4 | 6.535 |
| 2* | 7.04530 | 2.53080 | | | 5.259 |
| 3 | 10.60920 | 1.63120 | 1.83400 | 37.3 | 4.765 |
| 4 | 23.14870 | 2.21040 | | | 4.390 |
| 5(Diaphragm) | ∞ | 2.10000 | | | 3.281 |
| 6 | ∞ | 1.75670 | | | 3.400 |
| 7 | 11.27990 | 1.81650 | 1.83400 | 37.3 | 3.612 |
| 8 | 18.92380 | 2.59870 | | | 3.769 |
| 9 | −7.65990 | 0.45000 | 1.80351 | 25.0 | 4.153 |
| 10 | −307.35450 | 0.01000 | 1.56732 | 42.8 | 5.013 |
| 11 | −307.35450 | 2.96380 | 1.80300 | 46.5 | 5.019 |
| 12 | −9.09880 | 0.20000 | | | 5.595 |
| 13* | 23.00030 | 2.92800 | 1.60602 | 57.4 | 6.624 |
| 14* | −18.26310 | 1.68040 | | | 6.800 |
| 15* | −19.14590 | 0.70000 | 1.68400 | 31.3 | 6.946 |
| 16 | −47.67650 | (BF) | | | 7.199 |
| Image surface | ∞ | | | | |

TABLE 14

(Aspherical data)

Surface No. 1

K = 0.00000E+00, A4 = −2.18000E−04, A6 = 8.96000E−06, A8 = −1.17000E−07 A10 = 5.89000E−10

Surface No. 2

K = 0.00000E+00, A4 = −3.26000E−04, A6 = −2.44000E−06, A8 = 3.94000E−07 A10 = −7.49000E−09

Surface No. 13

K = 0.00000E+00, A4 = −5.12000E−05, A6 = −2.39000E−06, A8 = 2.19000E−08 A10 = −1.42000E−10

Surface No. 14

K = 0.00000E+00, A4 = 1.34000E−04, A6 = −1.58000E−06, A8 = 2.67000E−09 A10 = 2.13000E−10

Surface No. 15

K = 3.54000E+00, A4 = 1.09000E−04, A6 = 1.00000E−07, A8 = 1.06000E−08 A10 = 5.68000E−11

TABLE 15

(Various data)

| | |
|---|---|
| Focal length | 14.0001 |
| F-number | 2.58048 |
| View angle | 38.2841 |
| Image height | 10.0000 |
| Overall length of lens system | 38.8990 |
| BF | 14.6225 |

NUMERICAL EXAMPLE 5

The single focal length lens system of Numerical Example 5 corresponds to Embodiment 5 shown in FIG. 9. Table 13 shows the surface data of the single focal length lens system. Table 14 shows the aspherical data. Table 15 shows various data.

NUMERICAL EXAMPLE 6

The single focal length lens system of Numerical Example 6 corresponds to Embodiment 6 shown in FIG. 11. Table 16 shows the surface data of the single focal length lens system. Table 17 shows the aspherical data. Table 18 shows various data.

TABLE 16

(Surface data)

| Surface number | r | d | nd | vd | Effective diameter |
|---|---|---|---|---|---|
| Object surface | ∞ | | | | |
| 1 | 21.82300 | 0.70000 | 1.52300 | 70.1 | 6.202 |
| 2* | 7.99110 | 4.82290 | | | 5.166 |
| 3 | −8.97820 | 0.45000 | 1.80610 | 33.3 | 4.165 |
| 4 | −24.09730 | 0.20000 | | | 4.177 |
| 5 | 19.09650 | 2.34010 | 1.80470 | 41.0 | 4.052 |
| 6* | −11.76320 | −0.20000 | | | 3.838 |
| 7(Diaphragm) | ∞ | 5.19630 | | | 3.536 |
| 8 | ∞ | 1.85980 | | | 3.432 |
| 9 | −5.94310 | 0.45000 | 1.84666 | 23.8 | 3.722 |
| 10 | −24.33140 | 0.01000 | 1.56732 | 42.8 | 4.577 |
| 11 | −24.33140 | 2.76980 | 1.77250 | 49.6 | 4.584 |
| 12 | −7.43100 | 0.20000 | | | 5.266 |
| 13 | 119.25950 | 2.76100 | 1.80359 | 40.8 | 6.450 |
| 14* | −15.01880 | 1.67020 | | | 6.701 |
| 15 | −16.54680 | 0.50000 | 1.84666 | 23.8 | 6.822 |
| 16 | −26.16940 | (BF) | | | 7.065 |
| Image surface | ∞ | | | | |

TABLE 17

(Aspherical data)

Surface No. 2

K = 0.00000E+00, A4 = −5.70000E−06, A6 = −3.23000E−06, A8 = 1.68000E−07 A10 = −2.82000E−09

Surface No. 6

K = 0.00000E+00, A4 = 1.44000E−04, A6 = 4.69000E−06, A8 = −3.93000E−07 A10 = 1.19000E−08

Surface No. 14

K = 0.00000E+00, A4 = 7.94000E−05, A6 = 2.04000E−07, A8 = −2.42000E−09 A10 = 3.89000E−11

TABLE 18

(Various data)

| Focal length | 13.6690 |
|---|---|
| F-number | 2.58051 |
| View angle | 38.8794 |
| Image height | 10.0000 |
| Overall length of lens system | 38.1991 |
| BF | 14.4690 |

NUMERICAL EXAMPLE 7

The single focal length lens system of Numerical Example 7 corresponds to Embodiment 7 shown in FIG. 13. Table 19 shows the surface data of the single focal length lens system. Table 20 shows the aspherical data. Table 21 shows various data.

TABLE 19

(Surface data)

| Surface number | r | d | nd | vd | Effective diameter |
|---|---|---|---|---|---|
| Object surface | ∞ | | | | |
| 1 | 40.00000 | 0.70000 | 1.58332 | 59.1 | 5.580 |
| 2* | 7.65380 | 2.71920 | | | 4.609 |
| 3 | 170.25310 | 0.45000 | 1.56732 | 42.8 | 4.223 |

TABLE 19-continued (Surface data)

| Surface number | r | d | nd | vd | Effective diameter |
|---|---|---|---|---|---|
| 4 | 8.22820 | 0.01000 | 1.56732 | 42.8 | 3.920 |
| 5 | 8.22820 | 2.32130 | 1.83481 | 42.7 | 3.918 |
| 6 | −43.96630 | 0.15140 | | | 3.610 |
| 7(Diaphragm) | ∞ | 3.38920 | | | 3.415 |
| 8 | −21.63750 | 1.36480 | 1.80420 | 46.5 | 3.515 |
| 9 | −11.92890 | 1.90510 | | | 3.670 |
| 10 | ∞ | 1.80740 | | | 3.881 |
| 11 | −7.06150 | 0.45000 | 1.84666 | 23.8 | 4.105 |
| 12 | −51.65670 | 0.01000 | 1.56732 | 42.8 | 4.969 |
| 13 | −51.65670 | 2.43920 | 1.80420 | 46.5 | 4.976 |
| 14 | −9.39430 | 0.20000 | | | 5.500 |
| 15* | −119.79880 | 2.81490 | 1.80359 | 40.8 | 6.293 |
| 16* | −12.09290 | 1.40000 | | | 6.669 |
| 17 | −33.07970 | 0.60000 | 1.80518 | 25.5 | 6.904 |
| 18 | −124.87890 | 0.70000 | | | 7.066 |
| 19 | ∞ | (BF) | | | 7.261 |
| Image surface | ∞ | | | | |

TABLE 20

(Aspherical data)

Surface No. 2

K = 0.00000E+00, A4 = 1.08000E−04, A6 = 2.17000E−07, A8 = 1.19000E−07 A10 = 2.02000E−10

Surface No. 15

K = 0.00000E+00, A4 = −7.68000E−05, A6 = −5.84000E−07, A8 = 1.26000E−09 A10 = 1.76000E−11

Surface No. 16

K = 0.00000E+00, A4 = 3.26000E−05, A6 = −3.60000E−07, A8 = −2.71000E−09 A10 = 3.41000E−11

TABLE 21

(Various data)

| Focal length | 14.4530 |
|---|---|
| F-number | 2.58066 |
| View angle | 37.3569 |
| Image height | 10.0000 |
| Overall length of lens system | 37.7017 |
| BF | 14.2692 |

NUMERICAL EXAMPLE 8

The single focal length lens system of Numerical Example 8 corresponds to Embodiment 8 shown in FIG. 15. Table 22 shows the surface data of the single focal length lens system. Table 23 shows the aspherical data. Table 24 shows various data.

TABLE 22

(Surface data)

| Surface number | r | d | nd | vd | Effective diameter |
|---|---|---|---|---|---|
| Object surface | ∞ | | | | |
| 1 | 25.00000 | 0.70000 | 1.58332 | 59.1 | |
| 2* | 6.81100 | 3.78330 | | | |
| 3 | 121.55370 | 0.45000 | 1.56732 | 42.8 | |
| 4 | 10.39870 | 0.01000 | 1.56732 | 42.8 | |

TABLE 22-continued (Surface data)

| Surface number | r | d | nd | vd | Effective diameter |
|---|---|---|---|---|---|
| 5 | 10.39870 | 1.81650 | 1.83481 | 42.7 | |
| 6 | −45.37780 | 0.15960 | | | |
| 7(Diaphragm) | ∞ | 3.37000 | | | 3.375 |
| 8 | −21.94390 | 1.38200 | 1.80420 | 46.5 | 3.470 |
| 9 | −11.92890 | 2.53650 | | | |
| 10 | ∞ | 1.45960 | | | 4.148 |
| 11 | −9.36830 | 0.45000 | 1.84666 | 23.8 | |
| 12 | 54.74430 | 0.01000 | 1.56732 | 42.8 | |
| 13 | 54.74430 | 3.29280 | 1.80420 | 46.5 | |
| 14 | −9.94250 | 0.20000 | | | 5.788 |
| 15 | 184.29540 | 1.50990 | 1.80359 | 40.8 | |
| 16* | −34.17850 | (BF) | | | 8.275 |
| Image surface | ∞ | | | | |

TABLE 23

(Aspherical data)

Surface No. 2

K = 0.00000E+00, A4 = 2.31000E−05, A6 = 5.94000E−06,
A8 = −3.37000E−07 A10 = 8.57000E−09

Surface No. 16

K = 0.00000E+00, A4 = 4.59000E−05, A6 = 8.54000E−07,
A8 = −1.91000E−08 A10 = 1.88000E−10

TABLE 24

(Various data)

| Focal length | 13.5499 |
|---|---|
| F-number | 2.57999 |
| View angle | 39.1540 |
| Image height | 10.0000 |
| Overall length of lens system | 37.6990 |
| BF | 16.5688 |

NUMERICAL EXAMPLE 9

The single focal length lens system of Numerical Example 9 corresponds to Embodiment 9 shown in FIG. 17. Table 25 shows the surface data of the single focal length lens system. Table 26 shows the aspherical data. Table 27 shows various data.

TABLE 25

(Surface data)

| Surface number | r | d | nd | vd | Effective diameter |
|---|---|---|---|---|---|
| Object surface | ∞ | | | | |
| 1 | 16.55180 | 0.50000 | 1.48749 | 70.4 | 7.242 |
| 2 | 8.06330 | 5.16330 | | | 6.115 |
| 3 | −58.30810 | 0.50000 | 1.48749 | 70.4 | 5.025 |
| 4 | 12.56480 | 2.10650 | 1.83481 | 42.7 | 4.769 |
| 5 | −44.76210 | 0.89780 | | | 4.258 |
| 6(Diaphragm) | ∞ | 2.50000 | | | 3.370 |
| 7 | ∞ | 2.64140 | | | 4.323 |
| 8 | −6.62060 | 0.50000 | 1.78472 | 25.7 | 3.697 |
| 9 | −210.76500 | 2.51650 | 1.77200 | 50.0 | 4.317 |
| 10* | −7.59550 | 1.91680 | | | 4.696 |
| 11* | 33.18920 | 2.95460 | 1.77200 | 50.0 | 6.901 |
| 12* | −16.48880 | 1.20000 | | | 7.057 |

TABLE 25-continued (Surface data)

| Surface number | r | d | nd | vd | Effective diameter |
|---|---|---|---|---|---|
| 13* | −22.26660 | 0.70000 | 1.80359 | 40.8 | 7.089 |
| 14 | −99.91740 | (BF) | | | 7.298 |
| Image surface | ∞ | | | | |

TABLE 26

(Aspherical data)

Surface No. 10

K = −1.19000E−01, A4 = 0.00000E+00, A6 = 0.00000E+00,
A8 = 0.00000E+00 A10 = 0.00000E+00

Surface No. 11

K = 0.00000E+00, A4 = −5.59000E−06, A6 = −1.27000E−06,
A8 = 2.70000E−08 A10 = −1.75000E−10

Surface No. 12

K = 0.00000E+00, A4 = 1.53000E−04, A6 = −3.17000E−06,
A8 = 4.67000E−08 A10 = −2.88000E−10

Surface No. 13

K = 0.00000E+00, A4 = 1.11000E−04, A6 = −2.04000E−06,
A8 = 2.35000E−08 A10 = −1.70000E−10

TABLE 27

(Various data)

| Focal length | 14.3237 |
|---|---|
| F-number | 2.48056 |
| View angle | 37.6271 |
| Image height | 10.0000 |
| Overall length of lens system | 38.8990 |
| BF | 14.8021 |

NUMERICAL EXAMPLE 10

The single focal length lens system of Numerical Example 10 corresponds to Embodiment 10 shown in FIG. 19. Table 28 shows the surface data of the single focal length lens system. Table 29 shows the aspherical data. Table 30 shows various data.

TABLE 28

(Surface data)

| Surface number | r | d | nd | vd | Effective diameter |
|---|---|---|---|---|---|
| Object surface | ∞ | | | | |
| 1 | 24.05310 | 0.50000 | 1.65308 | 58.3 | |
| 2 | 7.28060 | 2.18000 | | | 5.268 |
| 3 | 55.65140 | 0.50000 | 1.59789 | 61.6 | |
| 4 | 13.18230 | 0.20000 | | | |
| 5 | 8.72130 | 2.75560 | 1.80422 | 46.5 | |
| 6 | −95.32570 | 1.10550 | | | 4.451 |
| 7(Diaphragm) | ∞ | 4.74140 | | | 3.259 |
| 8 | −5.26930 | 0.50000 | 1.72218 | 28.1 | 3.089 |
| 9 | −43.90900 | 0.01000 | 1.56732 | 42.8 | |
| 10 | −43.90900 | 2.39310 | 1.77200 | 50.0 | |
| 11* | −6.50630 | 2.03400 | | | 6.487 |
| 12* | 30.56100 | 3.61020 | 1.59000 | 59.0 | 6.856 |
| 13* | −13.82650 | 1.20000 | | | |
| 14* | −29.79900 | 0.70000 | 1.68900 | 31.0 | |
| 15 | ∞ | (BF) | | | |
| Image surface | ∞ | | | | |

TABLE 29

(Aspherical data)

Surface No. 11

K = 0.00000E+00, A4 = 2.44000E−04, A6 = −9.62000E−07,
A8 = 1.11000E−07 A10 = 3.72000E−09

Surface No. 12

K = 0.00000E+00, A4 = 1.25000E−04, A6 = −6.25000E−06,
A8 = 8.97000E−08 A10 = −4.04000E−10

Surface No. 13

K = 0.00000E+00, A4 = 2.18000E−04, A6 = −7.76000E−06,
A8 = 9.95000E−08 A10 = −3.61000E−10

Surface No. 14

K = 0.00000E+00, A4 = 1.60000E−04, A6 = −6.60000E−06,
A8 = 1.07000E−07 A10 = −6.59000E−10

TABLE 30

(Various data)

| Focal length | 14.4903 |
|---|---|
| F-number | 2.58012 |
| View angle | 37.1889 |
| Image height | 10.0000 |
| Overall length of lens system | 36.8994 |
| BF | 14.4696 |

The following Table 31 shows the corresponding values to the individual conditions in the single focal length lens systems of each of Numerical Examples.

TABLE 31

(Values corresponding to conditions)

| Numerical Example | Condition | | | |
|---|---|---|---|---|
| | (1): $f_W/f_{GF}$ | (2): $f_W/T_1$ | (3): $f_W/f_{G1}$ | (4): $(R_{11}+R_{12})/(R_{11}-R_{12})$ |
| 1 | 1.165 | 2.476 | 0.065 | 1.130 |
| 2 | 1.107 | 1.393 | 0.043 | 1.428 |
| 3 | 1.179 | 2.478 | 0.125 | 0.919 |
| 4 | 1.234 | 1.812 | 0.121 | 1.489 |
| 5 | 1.135 | 1.980 | −0.276 | 1.428 |
| 6 | 0.911 | 1.644 | 0.491 | 2.155 |
| 7 | 0.822 | 2.275 | 0.055 | 1.473 |
| 8 | 0.514 | 1.958 | −0.009 | 1.749 |
| 9 | 0.978 | 1.562 | 0.199 | 2.900 |
| 10 | 0.871 | 2.001 | 0.223 | 1.868 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A single focal length lens system, in order from an object side to an image side, comprising a front lens unit, an aperture diaphragm, and a rear lens unit composed of a plurality of lens units, wherein the front lens unit
includes a negative lens element which has negative optical power and is located closest to the object side, and a positive lens element which has positive optical power and is located on the image side relative to the negative lens element,
is composed of three or less lens elements, and
does not move along an optical axis but is fixed in focusing from an infinity in-focus condition to a close-object in-focus condition,
the rear lens unit includes a focusing lens unit which moves along the optical axis in focusing, and a fixed lens unit which does not move along the optical axis but is fixed in focusing, and
the following conditions (1), (2), and (3) are satisfied:

$$0.4 < f_W/f_{GF} < 1.5 \quad (1)$$

$$0.9 < f_W/T_1 < 4.5 \quad (2)$$

$$-0.3 < f_W/f_{G1} < 0.3 \quad (3)$$

where
$f_w$ is a focal length of the single focal length lens system in an infinity in-focus condition,
$f_{GF}$ is a focal length of the focusing lens unit,
$T_1$ is an optical axial distance from an object side lens surface of the negative lens element in the front lens unit to the aperture diaphragm, and
$f_{G1}$ is a focal length of the front lens unit.

2. The single focal length lens system as claimed in claim 1, wherein the negative lens element in the front lens unit satisfies the following condition (4):

$$0.7 < (R_{11}+R_{12})/(R_{11}-R_{12}) < 3.5 \quad (4)$$

where
$R_{11}$ is a radius of curvature of the object side lens surface of the negative lens element, and
$R_{12}$ is a radius of curvature of an image side lens surface of the negative lens element.

3. The single focal length lens system as claimed in claim 1, wherein the focusing lens unit has at least one aspheric surface.

4. The single focal length lens system as claimed in claim 1, wherein the front lens unit has at least one aspheric surface.

5. An interchangeable lens apparatus comprising:
the single focal length lens system as claimed in claim 1; and
a lens mount section which is connectable to a camera body including an image sensor for receiving an optical image formed by the single focal length lens system and converting the optical image into an electric image signal.

6. A camera system comprising:
an interchangeable lens apparatus including the single focal length lens system as claimed in claim 1; and a camera body which is detachably connected to the interchangeable lens apparatus via a camera mount section, and includes an image sensor for receiving an optical image formed by the single focal length lens system and converting the optical image into an electric image signal.

* * * * *